(12) United States Patent
Bartley et al.

(10) Patent No.: US 10,548,216 B2
(45) Date of Patent: Jan. 28, 2020

(54) EMPLOYING CONDUCTIVE TRACK WRITING IN A TAMPER-RESPONDENT SYSTEM

(71) Applicant: International Business Machines Corporation, Armonk, NY (US)

(72) Inventors: Gerald K. Bartley, Rochester, MN (US); Darryl J. Becker, Rochester, MN (US); Matthew S. Doyle, Chatfield, MN (US); Mark J. Jeanson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 72 days.

(21) Appl. No.: 15/465,453

(22) Filed: Mar. 21, 2017

(65) Prior Publication Data
US 2018/0276419 A1 Sep. 27, 2018

(51) Int. Cl.
*G06F 21/86* (2013.01)
*H05K 1/02* (2006.01)

(52) U.S. Cl.
CPC . *H05K 1/0275* (2013.01); *H05K 2201/10151* (2013.01)

(58) Field of Classification Search
CPC ....... G06F 21/86; G06F 21/87; H05K 1/0275; H05K 2201/10151; H05K 2201/20; H05K 7/1427; G06K 19/073
See application file for complete search history.

(56) References Cited

U.S. PATENT DOCUMENTS

| 5,858,500 | A  | * | 1/1999 | MacPherson | E05G 1/14 264/259 |
|---|---|---|---|---|---|
| 7,060,421 | B2 | * | 6/2006 | Naundorf | H05K 3/105 430/322 |
| 7,065,656 | B2 |   | 6/2006 | Schwenck et al. | |

(Continued)

OTHER PUBLICATIONS

Federal Information Processing Standards Publication 140-2, "Security Requirements for Cryptographic Modules", National Institute of Standards and Technology, Gaithersburg, Maryland, Issued May 25, 2001, Change Notice Dec. 3, 2002, 69 pages.

(Continued)

*Primary Examiner* — Carl G Colin
*Assistant Examiner* — Tarek Elarabi
(74) *Attorney, Agent, or Firm* — Matthew J. Bussan

(57) ABSTRACT

In some embodiments, a tamper-respondent system includes a PCB having a coating on a surface thereof, wherein the coating includes spinel-based, non-conductive metal oxide mixed into a non-conductive supporting material. The tamper-respondent system also includes a conductive track writing unit, a sensor, and an enclosure substantially enclosing the PCB, conductive track writing unit, and sensor. Responsive to a determination that a signal output from the sensor is indicative of tampering, the conductive track writing unit writes a conductive track within a predetermined portion of the coating by irradiating the predetermined portion of the coating to reduce the spinel-based, non-conductive metal oxide in the predetermined portion of the coating to metal nuclei. In some embodiments, the conductive track may modify circuit paths of the PCB and/or create electrical features on the PCB detectable by monitoring agents.

17 Claims, 10 Drawing Sheets

(56) References Cited

U.S. PATENT DOCUMENTS

| | | | |
|---|---|---|---|
| 7,388,486 B2 | 6/2008 | Dalzell et al. | |
| 7,429,915 B2 | 9/2008 | Cruzado et al. | |
| 7,569,331 B2 * | 8/2009 | Dorogy | H01B 1/16 |
| | | | 430/311 |
| 7,787,256 B2 * | 8/2010 | Chan | G06F 21/87 |
| | | | 174/250 |
| 7,945,792 B2 * | 5/2011 | Cherpantier | G06F 21/86 |
| | | | 365/145 |
| 7,978,070 B2 | 7/2011 | Hunter | |
| 8,341,758 B2 | 12/2012 | Kim et al. | |
| 8,451,020 B2 | 5/2013 | Weekly | |
| 8,465,905 B2 * | 6/2013 | Schuster | H05K 3/125 |
| | | | 430/311 |
| 8,659,908 B2 * | 2/2014 | Adams | H01L 23/573 |
| | | | 361/765 |
| 8,797,059 B2 | 8/2014 | Boday et al. | |
| 9,015,075 B2 | 4/2015 | Hughes et al. | |
| 9,117,833 B2 | 8/2015 | Mougin et al. | |
| 9,323,958 B2 | 4/2016 | Mostovych | |
| 9,379,066 B2 | 6/2016 | Marinet et al. | |
| 9,578,764 B1 * | 2/2017 | Fisher | H05K 5/0208 |
| 10,192,076 B1 * | 1/2019 | Razaghi | G06F 21/87 |
| 2002/0002683 A1 * | 1/2002 | Benson | G06F 21/86 |
| | | | 713/194 |
| 2006/0049941 A1 * | 3/2006 | Hunter | G01R 22/066 |
| | | | 340/545.6 |
| 2007/0155302 A1 | 7/2007 | Dangler et al. | |
| 2008/0091605 A1 * | 4/2008 | Hughes | G06F 21/31 |
| | | | 705/51 |
| 2009/0070887 A1 * | 3/2009 | Knowles | H01L 23/576 |
| | | | 726/34 |
| 2010/0025479 A1 | 2/2010 | Bartley et al. | |
| 2010/0177487 A1 * | 7/2010 | Arshad | G06F 21/86 |
| | | | 361/737 |
| 2012/0278905 A1 | 11/2012 | Condorelli et al. | |
| 2013/0283386 A1 * | 10/2013 | Lee | G06F 21/86 |
| | | | 726/26 |
| 2014/0297540 A1 * | 10/2014 | Swamy | G06K 7/0004 |
| | | | 705/71 |
| 2016/0262270 A1 | 9/2016 | Isaacs et al. | |
| 2017/0032151 A1 | 2/2017 | Sofia et al. | |
| 2017/0042023 A1 | 2/2017 | Doyle et al. | |
| 2017/0091492 A1 * | 3/2017 | Brodsky | G06F 21/87 |
| 2018/0124915 A1 * | 5/2018 | Busby | H05K 1/0275 |

OTHER PUBLICATIONS

"GORE Secure Encapsulated Module", 2 pages, downloaded from <https://www.gore.com/MungoBlobs/692/683/secure_encapsulated_module.pdf> on Feb. 6, 2017.

"DECTRIS detecting the future", 3 pages, printed from <https://www.dectris.com/Hybrid-Pixel_Details.html> on Jan. 20, 2017.

"Powerlite DLS 8000", 3 pages, downloaded from <http://www.photonicsolutions.co.uk/upfiles/CNPowerlite_DLS_8000.pdf> on Feb. 6, 2017.

"MAS.S64 Sci Fab: Science Fiction-Inspired Prototyping", 11 pages, printed from <http://scifab.media.mit.edu/2015/12/16/saccase-turrets-tracking-lasers-tracking-pupils-tracking-targets/> on Feb. 6, 2017.

"Miniature Stepper Motor Nema 8 Micro Stepper Motor—StepperOnline", 2 pages, printed from <http://www.omc-stepperonline.com/stepper-motors-nema-8-stepper-motors-c-1_32.html> on Feb. 6, 2017.

"FERRO Inorganic Pigments", 8 pages, downloaded from <http://www.ferro.com/NR/rdonlyres/DA6D6E95-EE0F-47BD-9A9E-18058FEC8F10/0/E_Pigments_03_12_V5.pdf> on Feb. 23, 2017.

* cited by examiner

EMPLOYING CONDUCTIVE TRACK WRITING IN A TAMPER-RESPONDENT SYSTEM

BACKGROUND

The present disclosure relates in general to the field of electronic packaging. More particularly, the present disclosure relates to protecting circuitry and content of electronic devices.

SUMMARY

Some embodiments of the present disclosure are directed towards a tamper-respondent system that includes a printed circuit board (PCB) having a coating on a surface thereof, wherein the coating includes spinel-based, non-conductive metal oxide mixed into a non-conductive supporting material. The tamper-respondent system also includes a conductive track writing unit, a sensor, and an enclosure substantially enclosing the PCB, conductive track writing unit, and sensor. Responsive to a determination that a signal output from the sensor is indicative of tampering, the conductive track writing unit writes a conductive track within a predetermined portion of the coating by irradiating the predetermined portion of the coating to reduce the spinel-based, non-conductive metal oxide in the predetermined portion of the coating to metal nuclei.

Some embodiments of the present disclosure are directed towards a method for implementing security protection in a tamper-respondent system, the method including receiving a signal from a sensor, determining whether the signal received from the sensor is indicative of tampering, and responsive to determining that the signal received from the sensor is indicative of tampering, activating a conductive track writing unit to write a conductive track within a predetermined portion of a coating on a surface of a PCB by irradiating the predetermined portion of the coating to reduce a spinel-based, non-conductive metal oxide in the predetermined portion of the coating to metal nuclei.

Some embodiments of the present disclosure are directed towards a computer program product for implementing security protection in a tamper-respondent system, the computer program product comprising a computer readable storage medium having program code embodied therewith, the program code executable by a processor or other programmable data processing apparatus to perform a method including receiving a signal from a sensor, determining whether the signal received from the sensor is indicative of tampering, and responsive to determining that the signal received from the sensor is indicative of tampering, activating a conductive track writing unit to write a conductive track within a predetermined portion of a coating on a surface of a PCB by irradiating the predetermined portion of the coating to reduce a spinel-based, non-conductive metal oxide in the predetermined portion of the coating to metal nuclei.

BRIEF DESCRIPTION OF THE SEVERAL VIEWS OF THE DRAWINGS

Embodiments of the present invention will hereinafter be described in conjunction with the appended drawings, where like designations denote like elements.

DETAILED DESCRIPTION

In some embodiments of the present disclosure, an electronic package is provided that is designed to meet the requirements of Federal Information Processing Standards Publication 140-2. The standard (FIPS PUB 140-2), which is named "Security Requirements for Cryptographic Modules," was issued by the U.S. National Institutes of Standards and Technology (NIST) in May 2001. The standard specifies the security requirements that must be satisfied by a cryptographic module utilized in a security system protecting sensitive but unclassified information. The standard provides four increasing, qualitative levels of security: Level 1 (lowest) to Level 4 (highest). These levels of security are intended to cover the wide range of potential applications and environments in which cryptographic modules may be deployed.

Level 4 provides the highest level of security defined in the standard. At this security level, the physical security mechanisms provide a complete envelope of protection around the cryptographic module with the intent of detecting and responding to all unauthorized attempts at physical access. Penetration of the cryptographic module enclosure from any direction has a very high probability of being detected, resulting in immediate nullification of all critical security parameters stored in the module. Level 4 cryptographic modules are useful for operation in physically unprotected environments.

Figure 1:
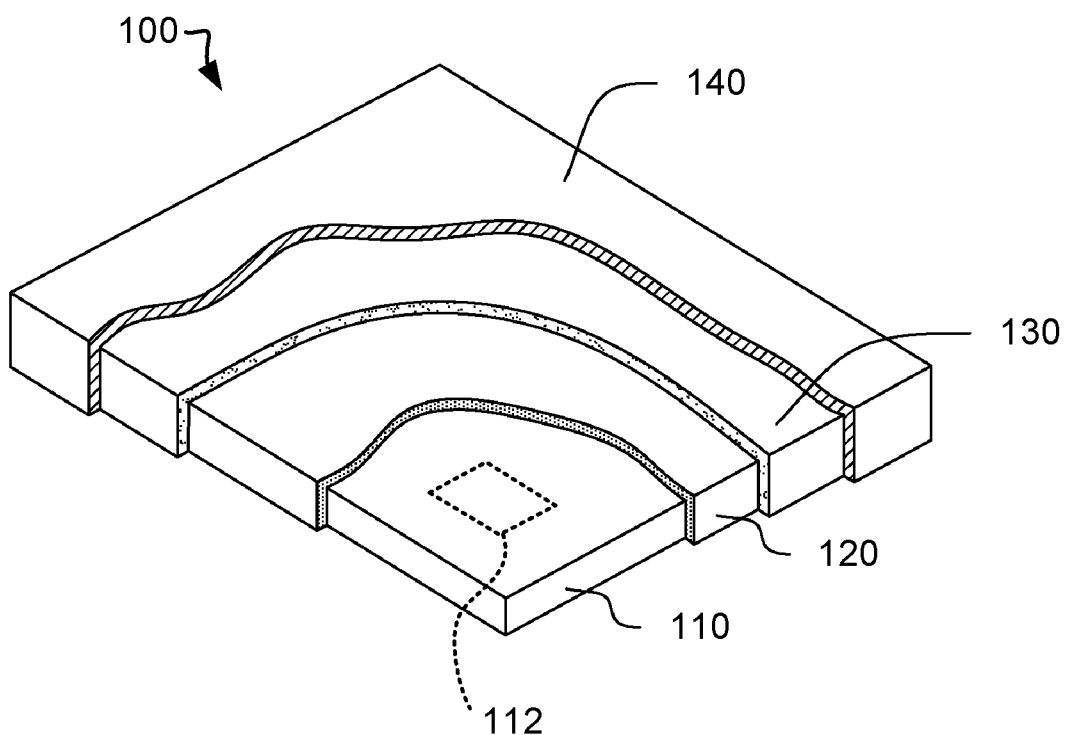
FIG. 1 is a partial cut-away perspective view of an electronic package configured as a tamper-respondent electronic package having conductive track writing capabilities, according to embodiments of the present disclosure.

Reference is first made to FIG. 1 of the drawings, which illustrates one embodiment of an electronic package 100, which may include conductive track writing capabilities, in accordance with one or more aspects of the present invention. By way of example, electronic package 100 is configured as a tamper-respondent electronic package for purposes of discussion. Electronic package 100 is designed to meet the requirements of FIPS 140-2, Level 4. Those skilled in the art will note from the following description, however, that the conductive track writing facilities disclosed herein are applicable to a variety of electronic package configurations.

In the depicted embodiment, an enclosure 110 is provided containing, for instance, an electronic assembly (e.g., 208 in FIG. 2), which in one embodiment may include a plurality of electronic components (e.g., 212 in FIG. 2), such as an encryption module and associated memory. The encryption module may comprise security-sensitive information with, for instance, access to the information stored in the encryption module requiring use of a variable key, and with the nature of the key being stored in the associated memory within the enclosure. In some embodiments, the encryption module and the associated memory may be a security-sensitive microelectronic device (520 in FIG. 5) embedded in a multi-layer printed circuit board (500 in FIG. 5).

In one or more implementations, a tamper-respondent system such as depicted is configured or arranged to detect and respond to attempts to tamper-with or penetrate into enclosure 110. Accordingly, enclosure 110 also includes, for instance, a conductive track writing controller (e.g., 1026 in FIG. 10) which, if tampering is detected by a sensor monitor (e.g., 1025 in FIG. 10), activates a conductive track writing unit 112 to protect information stored within the associated memory, as well as the encryption module. For example, if tampering is detected, the conductive track writing unit 112 may be activated to disable the encryption module and the associated memory. At least some of these components may be mounted on, and interconnected by, a printed circuit board (e.g., 210 in FIG. 2) or other substrate, and be internally powered via a power supply provided within the enclosure.

In the embodiment illustrated, and as one example only, enclosure 110 is surrounded by a tamper sensor 120, an encapsulant 130, and an outer, thermally conductive enclosure 140. In one or more implementations, tamper sensor 120 may comprise a folded, tamper-sensing laminate, and encapsulant 130 may be provided in the form of a molding. Tamper sensor 120 may include various detection layers, which are monitored via a ribbon cable (discussed below) by the sensor monitor, against attempts to penetrate enclosure 110. The tamper sensor 120 may be, for example, any such article commercially available or described in various publications and issued patents.

As will be appreciated by one skilled in the art, aspects of the present disclosure may be embodied as an apparatus, method or computer program product. Accordingly, aspects of the present disclosure, such as the sensor monitor and the conductive track writing controller, may take the form of an entirely hardware embodiment, an entirely software embodiment (including firmware, resident software, micro-code, etc.), or an embodiment combining software and hardware aspects that may all generally be referred to herein as a "circuit," "module" or "system."

By way of example, tamper sensor 120 may be formed as a laminate comprising a number of separate layers with, for instance, an outermost lamination layer including a matrix of diagonally-extending, semi-conductive lines printed onto a regular, thin insulating film. The matrix of lines forms a number of continuous conductors which would be broken if attempts are made to penetrate the film. The lines may be formed, for instance, by printing carbon-loaded polyester ink onto the film, and selectively connecting the lines on each side, at the edges of the film. Connections between the lines and the sensor monitor, for instance, of the printed circuit board may be provided via, for instance, one or more ribbon cables. The ribbon cable itself may be formed of lines of carbon-loaded ink printed onto an extension of the film, if desired. Connections between the matrix and the ribbon cable may be made via connectors formed on one edge of the film. As noted, the laminate may be folded to define the tamper sensor 120 surrounding enclosure 110.

By way of further explanation, the laminate may also include a laser and pierce-sensing layer, which may include tracks of carbon-loaded polyester ink printed onto opposite sides of an electrically insulating film. The tracks on opposite sides of the film may be of the same pattern, but offset to lie directly below spaces between the tracks in the opposite surface. The tracks may be of a width and pitch that such piercing of the film at any point results in damage to at least one of the tracks. Providing the tracks of carbon-loaded polyester ink printed in a saw-tooth pattern on opposite sides of the film makes it more difficult to cut the film without detection, as a slot of any length in the film is ensured to intersect with one of the tracks. The tracks may be connected in series to define one or more conductors, and be electrically connected to the sensor monitor associated with the electronic assembly. The resistance of the tracks is monitored by the sensor monitor, and detection of an increase in resistance, caused by cutting of one or more of the tracks, will cause activation of the conductive track writing unit to protect information stored within the associated memory, as well as the encryption module. For example, if an increase in the resistance of the tracks is detected by the sensor monitor, the conductive track writing unit may be activated by the conductive track writing controller to disable the encryption module and the associated memory by forming one or more conductive tracks on a surface of the printed circuit board on which the encryption module and the associated memory are mounted. The conductive track(s) may, for example, short the encryption module and/or the associated memory to ground. In some embodiments, the conductive track(s) may modify circuit paths and/or create electrical features detectable by monitoring agents.

The various elements of the laminate may be adhered together and folded around enclosure 110, in a similar manner to gift-wrapping a parcel, to define the tamper sensor 120. The assembly may be placed in a mold which is then filled with, for instance, cold-pour polyurethane, and the polyurethane may be cured and hardened to form encapsulant 130. The encapsulant 130 may, in one or more embodiments, completely surround the tamper sensor 120 and enclosure 110, and thus form a complete environmental seal, protecting the interior of the enclosure. The hardened polyurethane is resilient and increases robustness of the electronic package in normal use. Outer, thermally conductive enclosure 140 may optionally be provided over encapsulant 130 to, for instance, provide further structural rigidity to the electronic package.

Within the context of a sealed electronic package, such as the tamper-respondent electronic package 110 depicted in FIG. 1 and described above, structures and methods for writing one or more conductive tracks may be provided. An exemplary tamper-respondent electronic package employing such conductive track writing facilities is described in greater detail below with reference to FIG. 2.

One skilled in the art will appreciate, however, that the conductive track writing facilities disclosed herein are applicable to a myriad of other tamper-respondent electronic packages. For example, the conductive track writing facilities disclosed herein are applicable to tamper-respondent electronic packages that include tamper sensors configured differently or that include different types of tamper sensors, e.g., tamper sensors that detect changes in the pressure within the enclosure, tamper sensors that detect X-ray photons travelling through the enclosure, etc. A tamper sensor that detects changes in pressure, for instance, may be akin to that utilized in a tire pressure monitoring system (TPMS) of an automobile. A tamper sensor that detects X-ray photons, for instance, may be provided by employing one or more solid-state sensors that directly convert X-ray photons into electric charge. Detector modules that incorporate such direct detection technology are available from manufacturers such as DECTRIS Ltd., Baden, Switzerland.

Figure 2:
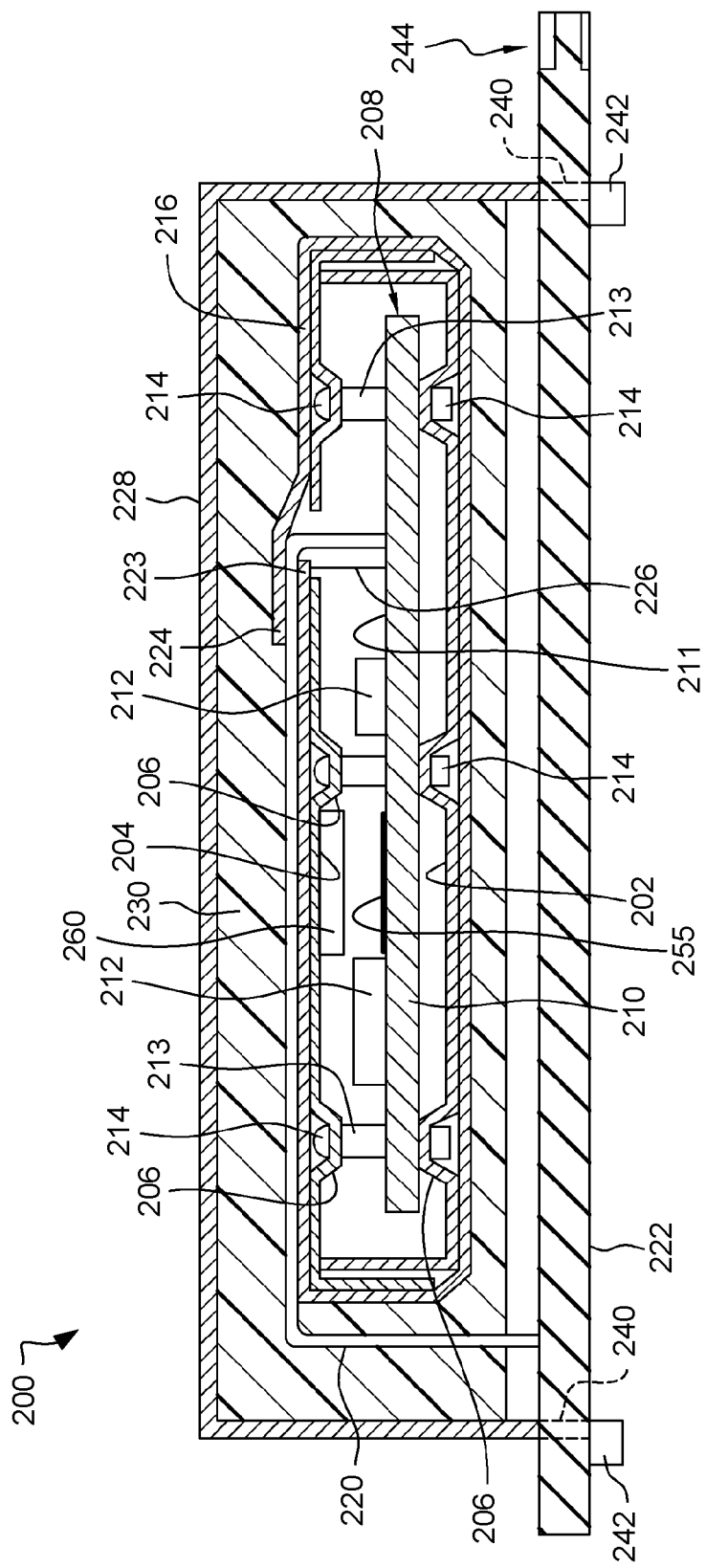
FIG. 2 is a cross-sectional elevational view of an electronic package configured as a tamper-respondent electronic package having conductive track writing capabilities, according to embodiments of the present disclosure.

FIG. 2 depicts in detail one embodiment of a tamper-respondent electronic package 200, which may have conductive track writing capabilities. Tamper-respondent electronic package 200 is designed to meet the requirements of FIPS 140-2, Level 4. Electronic package 200 is defined by, for instance, a base metal shell 202 and a top metal shell 204. Outer surfaces of base metal shell 202 and top metal shell 204 may be provided with dimples 206, with an electronic assembly 208 resting on dimples 206 defined in base metal shell 202. Electronic assembly 208 may include, for instance, a printed circuit board 210 with electronic components 212 that are electrically connected via conductors (not shown) defined within or on printed circuit board 210. In the embodiment illustrated in FIG. 2, electronic components 212 are shown mounted on a surface 211 of printed circuit board 210. One skilled in the art will appreciate, however, that electronic components may be embedded within printed circuit board 210 in lieu of, or in addition to, being mounted on surface 211 of printed circuit board 210. Printed circuit board 210 may be, for instance, a multi-layer printed circuit board in which electronic components such as an encryption module and associated memory are embedded.

In the embodiment illustrated in FIG. 2, and as one example only, at least a portion of surface 211 of printed circuit board 210 also includes a coating 255. Coating 255 includes spinel-based, non-conductive metal oxide mixed into a non-conductive supporting material. The spinel-based, non-conductive metal oxide in coating 255 may be selectively reduced to metal nuclei using a laser beam to form one or more conductive tracks on surface 211 of printed circuit board 210. In some embodiments, the conductive track(s) may modify circuit paths of printed circuit board 210 and/or create electrical features on printed circuit board 210 detectable by monitoring agents. Security-sensitive hardware or strategic sections of printed circuit board 210 can be protected by, for example, disabling all or certain parts of the security-sensitive hardware, rerouting sensitive 10 traffic, and/or altering specific timing or other signaling paths.

The laser beam may be selectively emitted from a conductive track writing unit 260 mounted, for instance, on an interior surface of the top metal shell 204. The laser beam is normally OFF, but may be emitted from conductive writing unit 260 and applied to coating 255 upon detection of a security threat. A conductive track writing controller (e.g., a monitoring circuit of printed circuit board 210) guides one or more lasers within conductive track writing unit 260 to write one or more conductive tracks within coating 255, thereby disabling all or certain parts of security-sensitive hardware of printed circuit board 210, and/or rerouting and/or altering signaling features based on pre-determined plans or based on real-time security threat information.

In lieu of being mounted on an interior surface of top metal shell 204, conductive track writing unit 260 may be mounted on printed circuit board 210 or any other suitable location within the enclosure formed by base and top metal shells 202, 204. The laser beam may be selectively emitted from conductive track writing unit 260 mounted on surface 211 of printed circuit board 210, for example, and applied to coating 255 via reflection from a mirrored interior surface of top metal shell 204.

In the embodiment illustrated in FIG. 2, coating 255 is shown provided on a single portion of upper surface 211 of printed circuit board 210. One skilled in the art will appreciate, however, coating 255 may be provided at any suitable location(s) on printed circuit board 210 or other substrate. For example, the coating may be provided on the entire upper surface 211, or one or more portions thereof; and/or on the entire lower surface of printed circuit board 210, or one or more portions of the lower surface.

In the embodiment illustrated in FIG. 2, a single conductive track writing unit 260 is shown mounted on an interior surface of top metal shell 204. One skilled in the art will appreciate, however, any number of conductive track writing units may be mounted at any suitable location(s) within the enclosure formed by base and top metal shells 202, 204. For example, one or more conductive track writing units may be mounted on an interior surface of top metal shell 204 and/or base metal shell 202. Likewise, one or more conductive track writing units may be mounted on upper surface 211 and/or the lower surface of printed circuit board 210.

Hollow spacers 213 may be placed below dimples 206 in top metal shell 204, and rivets 214 provided, extending through openings in dimples 206, through hollow spacers 213 and through openings in printed circuit board 210 to base metal shell 202 in order to fixedly secure electronic assembly 208 within the enclosure formed by base and top metal shells 202, 204. A security mesh or tamper sensor 216 is wrapped around the top, base, and four sides of the enclosure formed by base and top metal shells 202, 204. As illustrated, in one or more embodiments, top metal shell 204 may have an opening through which a bus 220 extends. One end of bus 220 may be connected to conductors (not shown) on printed circuit board 210, and the other end may be connected to conductors (not shown) on a printed circuit board 222. As bus 220 passes through the opening, the bus extends between an inner edge region 223 of the security mesh 216 and an overlapping, outer edge region 224 of the security mesh 216. A group of wires 226 connect, in one embodiment, security mesh 216 to conductors on printed circuit board 210. Circuitry on printed circuit board 210 is responsive to a break in security mesh 216, in which case, the an alarm signal may be emitted on bus 220, and also conductive track writing unit 260 may be activated to protect encryption/decryption keys stored within electronic assembly 208.

In one or more implementations, liquid polyurethane resin may be applied to security mesh 216 and cured. An outer, thermally conductive enclosure 228, such as a copper enclosure, may be filled with liquid polyurethane resin with the electronic assembly and inner enclosure and security mesh suspended within it. Upon curing the resin, the electronic assembly and inner enclosure and security mesh become embedded in a polyurethane block or encapsulants 230, as shown. The enclosure 228 is mounted on the printed circuit board 222, which can be accomplished using, for instance, legs 240 which extend through slots in the printed circuit board 222 and terminate in flanges 242, which are then bent out of alignment with the slots. Bus 220 may be connected, by way of printed circuit board 222 to connectors 244 located along, for instance, one edge of printed circuit board 222.

Figure 3:
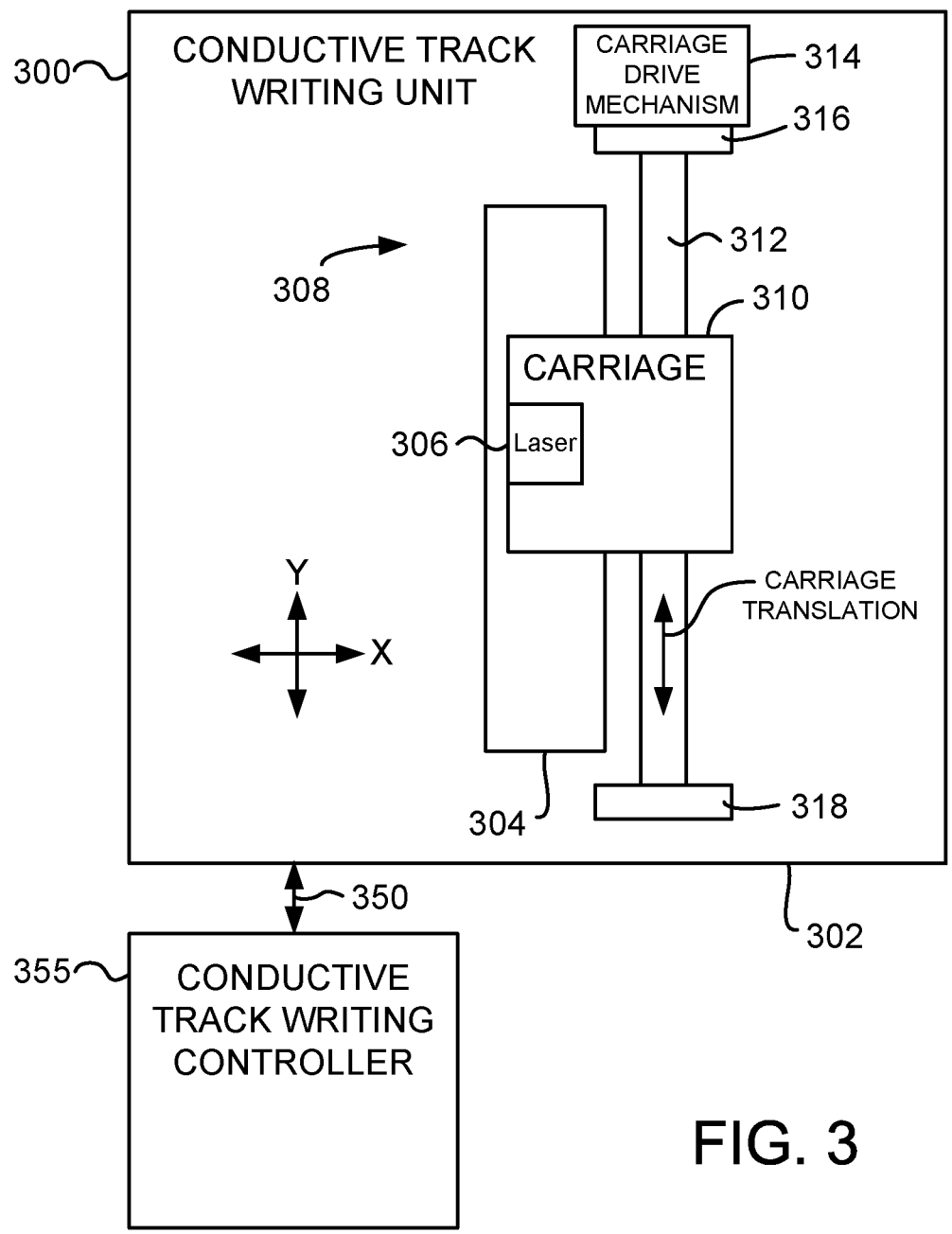
FIG. 3 is a block diagram illustrating a conductive track writing unit having one-dimensional conductive track writing capabilities, according to embodiments of the present disclosure.

FIG. 3 is a block diagram illustrating an exemplary conductive track writing unit 300 having one-dimensional conductive track writing capabilities suitable for use in an electronic package, such as the tamper-respondent electronic package 100 of FIG. 1 or the tamper-respondent electronic package 200 of FIG. 2. Those skilled in the art will appreciate, however, that the particular conductive track writing unit 300 having one-dimensional conductive track writing capabilities illustrated in FIG. 3 is exemplary and that a conductive track writing unit used in accordance with embodiments of the present disclosure may take many other forms. For example, a conductive track writing unit having two-dimensional conductive track writing capabilities (e.g., 400 in FIG. 4) may be used in accordance with some embodiments of the present disclosure.

The conductive track writing unit 300 illustrated in FIG. 3 may correspond to the conductive track writing unit 112 of FIG. 1, as well as the conductive track writing unit 260 of FIG. 2. Referring temporarily back to FIG. 2, for example, the conductive track writing unit 260 in the form of the conductive track writing unit 300 of FIG. 3 having one-dimensional conductive track writing capabilities may move a laser linearly (e.g., in the y-direction) to selectively irradiate one or more predetermined portions of the coating 255 applied on the surface 211 of the printed circuit board 210 to form one or more conductive tracks within the coating 255 by reducing the spinel-based, non-conductive metal oxide in the predetermined portion(s) of the coating 255 to metal nuclei.

Referring again to FIG. 3, the conductive track writing unit 300 includes an enclosure 302, an opening 304, a laser 306 (e.g., a Nd:YAG laser), and a linear actuator 308. The conductive track writing unit 300 may be mounted within an electronic package (e.g., the tamper-respondent electronic package 200 of FIG. 2) so that the opening 304 is positioned above one or more predetermined portions of a coating (e.g., the coating 255 of FIG. 2) applied on a surface of a substrate (e.g., the printed circuit board 210 of FIG. 2) where, in response to detection of tampering, one or more conductive tracks are to be formed by irradiating the one or more predetermined portions of the coating with a laser beam emitted from the laser 306. The linear actuator 308 produces linear relative movement between the laser 306 and the coating of the substrate (e.g., in the y-direction along the surface of the substrate).

The linear actuator 308 may, for example, be a modified (e.g., miniaturized) version of a conventional linear actuator, such as used in CD-ROM drive.

In the embodiment illustrated in FIG. 3, the linear actuator 308 includes a carriage 310, a carriage guide rod 312, a carriage drive mechanism 314, and a pair of guide rod mounts 316, 318. The laser 306 is mounted on the carriage 310, which is moved on the carriage guide rod 312 between upper and lower guide rod mounts 316, 318 by the carriage drive mechanism 314. The carriage drive mechanism 314 may drive the carriage 310 in the y-direction with sufficient precision using, for instance, a servo controlled stepper motor/lead screw arrangement (not shown). One skilled in the art will appreciate, however, that any suitable drive mechanism may be used, such as a servo controlled stepper motor/belt arrangement or servo controlled stepper motor/rack-and-pinion arrangement. Such servo controlled stepper motor arrangements and their operation are conventional and well known in the art.

The particular configuration of the enclosure 302, the opening 304, the laser 306, and the linear actuator 308 of the conductive track writing unit 300 illustrated in FIG. 3 is exemplary and for purposes of illustrating an embodiment of the present disclosure and, hence, the particular configuration illustrated therein is not limiting.

One or more connections 350 (e.g., a data bus, control busses, etc.) may couple the conductive track writing unit 300 to a conductive track writing controller 355. The conductive track writing controller 355 may, in response to detection of tampering, activate the laser 306 and the linear actuator 308 to form one or more conductive tracks. For example, the conductive track writing controller 355 may activate the laser 306; activate the linear actuator 308 to move the then-activated laser 306 to irradiate, along a predetermined a linear path, a predetermined portion of a coating (e.g., coating 255 of FIG. 2) applied on a surface of a printed circuit board (e.g., the printed circuit board 210 of FIG. 2) to form a conductive track, defined by the predetermined linear path, within the coating by reducing spinel-based, non-conductive metal oxide in the coating to metal nuclei; and then deactivate the laser. The conductive track writing controller 355 may form additional conductive tracks by repeating the above-described sequence of operations. An appropriate data bus and/or appropriate control busses may connect the conductive track writing unit 300 to the conductive track writing controller 355 in a manner well known in the art.

In the embodiment illustrated in FIG. 3, the conductive track writing controller 355 does not reside within the conductive track writing unit 300. The conductive track writing controller 355 may, for instance, reside on or be embedded within the printed circuit board that contains the electronic component(s) to be protected (e.g., the printed circuit board 210 of FIG. 2). One skilled in the art will appreciate, however, that in an alternative embodiment the conductive track writing controller 355 may reside (at least partially) within the conductive track writing unit 300.

Figure 4:
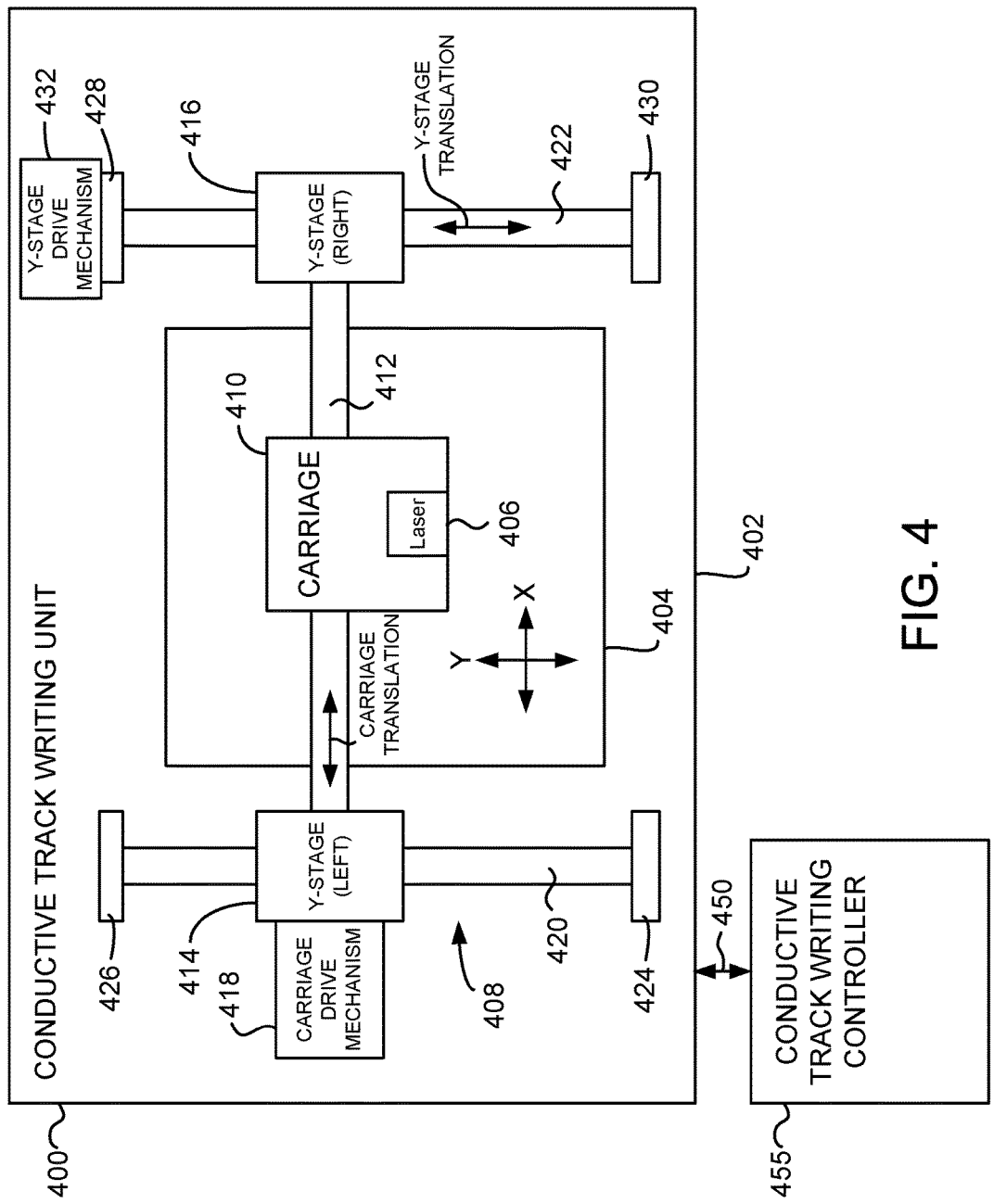
FIG. 4 is a block diagram illustrating a conductive track writing unit having two-dimensional conductive track writing capabilities, according to embodiments of the present disclosure.

FIG. 4 is a block diagram illustrating an exemplary conductive track writing unit 400 having two-dimensional conductive track writing capabilities suitable for use in an electronic package, such as the tamper-respondent electronic package 100 of FIG. 1 and the tamper-respondent electronic package 200 of FIG. 2. Those skilled in the art will appreciate, however, that the particular conductive track writing unit 400 having two-dimensional conductive track writing capabilities illustrated in FIG. 4 is exemplary and that a conductive track writing unit having two-dimensional conductive track writing capabilities used in accordance with embodiments of the present disclosure may take many other forms. For example, a conductive track writing unit having two-dimensional conductive track writing capabilities used in accordance with embodiments of the present disclosure may include alternative x-y plane drive mechanisms in lieu of those mechanisms illustrated in FIG. 4.

The conductive track writing unit 400 illustrated in FIG. 4 may correspond to the conductive track writing unit 112 of FIG. 1, as well as the conductive track writing unit 260 of FIG. 2. Referring temporarily back to FIG. 2, for example, the conductive track writing unit 260 in the form of the conductive track writing unit 400 of FIG. 4 having two-dimensional conductive track writing capabilities may move a laser in an x-y plane to selectively irradiate one or more predetermined portions of the coating 255 applied on the surface 211 of the printed circuit board 210 to form one or more conductive tracks within the coating 255 by reducing the spinel-based, non-conductive metal oxide in the predetermined portion(s) of the coating 255 to metal nuclei.

Referring again to FIG. 4, the conductive track writing unit 400 includes an enclosure 402, an opening 404, a laser 406 (e.g., a Nd:YAG laser), and an x-y plane actuator 408. The conductive track writing unit 400 may be mounted within an electronic package (e.g., the tamper-respondent electronic package 200 of FIG. 2) so that the opening 404 is positioned above one or more predetermined portions of a coating (e.g., the coating 255 of FIG. 2) applied on a surface of a substrate (e.g., the printed circuit board 210 of FIG. 2) where, in response to detection of tampering, one or more conductive tracks are to be formed by irradiating the one or more predetermined portions of the coating with a laser beam emitted from the laser 406. The x-y plane actuator 408 produces relative movement between the laser 406 and the coating in an x-y plane of the substrate, i.e., parallel to the surface of the substrate.

The x-y plane actuator 408 may, for example, be a modified (e.g., miniaturized) version of a conventional x-y plane actuator, such as used in selective laser sintering of plastic powders (i.e., 3D printing).

In the embodiment illustrated in FIG. 4, the x-y plane actuator 408 includes a carriage 410, a carriage guide rod 412, a pair of y-stage blocks 414, 416, a carriage drive mechanism 418, a pair of y-stage guide rods 420, 422, two pair of y-stage guide rod mounts 424, 426, 428, 430, and a y-stage drive mechanism 432. The laser 406 is mounted on the carriage 410, which is moved on the carriage guide rod 412 between the y-stage block (left) 414 and the y-stage block (right) 416 by the carriage drive mechanism 418. The carriage drive mechanism 418 may drive the carriage 410 in the x-direction with sufficient precision using, for instance, a servo controlled stepper motor/lead screw arrangement (not shown). One skilled in the art will appreciate, however, that any suitable drive mechanism may be used, such as a servo controlled stepper motor/belt arrangement or servo controlled stepper motor/rack-and-pinion arrangement. Such servo controlled stepper motor arrangements and their operation are conventional and well known in the art.

The y-stage blocks 414, 416 are moved on the y-stage guide rods 420, 422 between y-stage guide rod mounts (upper) 426, 428 and y-stage guide rod mounts (lower) 424, 430 by the y-stage drive mechanism 432. The carriage 410, the carriage guide rod 412 and the carriage drive mechanism 416 move along with the y-stage blocks 414, 416. Typically, the y-stage drive mechanism 432 drives the y-stage blocks 414, 416 (and, by extension, the carriage 410) in the y-direction with sufficient precision using a servo controlled stepper motor/lead screw arrangement (not shown). One skilled in the art will appreciate, however, that any suitable conventional drive mechanism may be used, such as a servo controlled stepper motor/belt arrangement or servo controlled stepper motor/rack-and-pinion arrangement. Such servo controlled stepper motor arrangements and their operation are conventional and well known in the art.

The particular configuration of the enclosure 402, the opening 404, the laser 406, and the x-y plane actuator 408 of the conductive track writing unit 400 illustrated in FIG. 4 is exemplary and for purposes of illustrating an embodiment of the present disclosure and, hence, the particular configuration illustrated therein is not limiting.

One or more connections 450 (e.g., a data bus, control busses, etc.) may couple the conductive track writing unit 400 to a conductive track writing controller 455. The conductive track writing controller 455 may, in response to detection of tampering, activate the laser 406 and the x-y plane actuator 408 to form one or more conductive tracks. For example, the conductive track writing controller 455 may activate the laser 406; activate the x-y plane actuator 408 to move the then-activated laser 406 to irradiate, along a predetermined a two-dimensional path, a predetermined portion of a coating (e.g., coating 255 of FIG. 2) applied on a surface of a printed circuit board (e.g., the printed circuit board 210 of FIG. 2) to form a conductive track, defined by the predetermined two-dimensional path, within the coating by reducing spinel-based, non-conductive metal oxide in the coating to metal nuclei; and then deactivate the laser. The conductive track writing controller 455 may form additional conducive tracks by repeating the above-described sequence of operations. An appropriate data bus and/or appropriate control busses may connect the conductive track writing unit 400 to the conductive track writing controller 455 in a manner well known in the art.

In the embodiment illustrated in FIG. 4, the conductive track writing controller 455 does not reside within the conductive track writing unit 400. The conductive track writing controller 455 may, for instance, reside on or be embedded within the printed circuit board that contains the electronic component(s) to be protected (e.g., the printed circuit board 210 of FIG. 2). One skilled in the art will appreciate, however, that in an alternative embodiment the conductive track writing controller 455 may reside (at least partially) within the conductive track writing unit 400.

In some embodiments, conductive tracks are formed in irradiated areas of a coating applied on a surface of a printed circuit board. The coating includes one or more electrically non-conductive metal compounds dispersed in an electrically non-conductive support material. Electromagnetic radiation (e.g., a laser beam emitted from a laser, such as the laser 306 of FIG. 3 or the laser 406 of FIG. 4) is used to break up the electrically non-conductive metal compounds dispersed in the electrically non-conductive support material and, thereby, produce metal nuclei in irradiated areas of the coating. The electrically non-conductive metal compounds are insoluble spinel-based, inorganic oxides which are thermally stable, and which are higher oxides with a spinel structure, and which remain unchanged in non-irradiated areas of the coating. The spinel-based, inorganic oxides used are heat resistant and remain stable after being subjected to soldering temperatures. The conductive tracks are reliably and easily produced. For example, the conductive tracks may be produced by irradiating areas of the coating in which the conducive tracks are to be formed with a laser beam emitted from a laser of a conductive track writing unit (e.g., the conductive track writing unit 300 of FIG. 3 or the conductive track writing unit 400 of FIG. 4) to break down the non-conductive metal compounds and release metal nuclei.

In some embodiments, the electrically non-conductive metal compounds are very finely distributed in the electrically non-conductive support material using a high shear dispersion mixer or other suitable technique known to those skilled in the art.

In some embodiments, the coating may contain a relatively low proportion of nucleating additives. In other embodiments, the coating may contain a relatively high proportion of nucleating additives. Choice of the proportion of the nucleating additives provides the user with control over the resistance of the resulting via and/or conductive track.

In some embodiments, the electrically non-conductive metal compounds are selected from a group consisting of higher oxides which contain at least two different kinds of cations and have a spinel structure or spinel-related structure, and which remain unchanged in non-irradiated areas of the electrically non-conductive support material. Classic spinels are mixed metal oxides of magnesium and aluminum, but the magnesium may be wholly or partially replaced by iron, zinc, and/or manganese, and the aluminum may be wholly or partially replaced by iron and/or chromium. Spinel-related mixed oxide structures also may contain nickel and/or cobalt cations.

In some embodiments, the spinel or spinel-related structure contains copper, chromium, iron, cobalt, nickel, or a mixture of two or more of the foregoing. Copper may be particularly advantageous. A suitable example is a copper-containing (Cu—Cr) spinel known as PK 3095, available from Ferro Corporation, Mayfield Heights, Ohio.

In some embodiments, the electrically non-conductive support material may be any suitable solder mask or cover-coat material conventionally used in the fabrication of printed circuit boards. Cover-coat materials are also known as conformal coatings. Conventional solder mask and cover-coat materials are typically polymers (e.g., epoxy) that are applied using liquid processes, such as curtain coating, silkscreen printing, spraying, dipping, spin-coating, casting, etc. Alternatively, dry processes such as vacuum lamination may be used to apply solder mask or cover-coat materials that are dry film materials. More generally, the electrically non-conductive support material may be a thermoplastic synthetic resin material, a thermosetting synthetic resin material, or any other suitable electrically non-conductive material, e.g., a ceramic. The electrically non-conductive support material may additionally contain one or more inorganic fillers, such as silicic acid and/or silicic acid derivatives.

Conventional conformal coatings typically fall into several generic classes: silicones, epoxies, acrylates, and other organic materials. Hence, a conformal coating composition in accordance with some embodiments of the present invention includes a polymer that may be, for example, one or more silicone-based polymers, one or more epoxy-based polymers, one or more acrylate-based polymers, and/or one or more other organic materials; and combinations thereof. For example, the polymer may be a conventional RTV silicone rubber composition, such as Dow Corning® 1-2620 RTV Coating or Dow Corning® 1-2620 Low VOC RTV Coating. More generally, the polymer may include, but is not limited to, any suitable polysiloxane, polyepoxide, polyacrylate and/or other organic polymeric material; and combinations thereof. Typically, it is desirable for the polymer to be non-water absorbing to avoid shorting from occurring through pathways created by water. It may also be desirable for the polymer to be halogen-free (i.e., RoHS compliant).

In some embodiments, a laser (e.g., a Nd:YAG laser) is used to produce the electromagnetic radiation to release the metal nuclei. The wavelength of the laser (e.g., a laser beam emitted from a laser, such as the laser 306 of FIG. 3 or the laser 406 of FIG. 4) may be any suitable wavelength. Suitable wavelengths range from 248 nm to 10,600 nm. Laser beams having wavelengths of 266 nm, 355 nm, 532 nm, and 1064 nm, for example, can be produced by the Powerlite DSL Series of high energy YAG lasers, available from Continuum, San Jose, Calif.

One may assume that for a given laser energy fluence (i.e., the amount of laser energy delivered in a single pulse expressed in joules/cm$^2$), X pulses are needed to convert all of the spinel-based non-conductive metal oxide into conductive metal nuclei. This, along with the proportion of nucleating additives in the coating, provides the user with control over the resistance of the resulting via and/or conductive track. If we assume the laser beam diameter is 1 mm (0.1 cm), then the area covered by the laser beam is 0.00785 cm$^2$. The Powerlite DSL 8000 high energy Nd:YAG laser, for instance, operating at a repetition rate of 10 Hz, based on data published by the manufacturer, delivers 1200 mJ of energy at a wavelength of 1064 nm. For the above-mentioned beam diameter, this high energy Nd:YAG laser produces a laser energy fluence of 152.8 J/cm$^2$ (1200 mJ/0.00785 cm$^2$). Because the repetition rate is 10 Hz, this Nd:YAG laser can deliver 1582 J/cm$^2$ every second. Therefore, the energy output of an "ordinary" low power compact (<300 mm$^2$) Nd:YAG laser is likely to be sufficient to translate the spinel-based non-conductive metal oxide into conductive tracks.

Illustrative Prophetic Example. A coating composition may be formed by adding 5 parts by weight of the copper-containing spinel PK 3095, available from Ferro Corporation, Mayfield Heights, Ohio, to 95 parts by weight of epoxy. The coating composition may be blended in a high shear dispersion mixer to uniformly distribute the copper-containing spinel within the epoxy. The coating composition may be, for example, deposited to a typical nominal thickness of 51 µm onto a surface of a printed circuit board by curtain coating. One skilled in the art will appreciate, however, that the coating may be deposited (or otherwise applied) to any suitable thickness onto a surface of a printed circuit board using any of a myriad of application techniques known to those skilled in the art. Similarly, the optional overcoating may be deposited (or otherwise applied) to any suitable thickness onto a surface of the coating using any of a myriad of application techniques know to those skilled in the art.

In some embodiments, the spinel-based, non-conductive metal oxide may be embedded above or between parallel plates, instead of solely within the solder mask or cover-coat material. In some embodiments, capacitance may be created (above a plate). In some embodiments, impedance may be changed (between plates). For instance, a "mini-plane" of conductive material may be rendered using one or more laser beams, changing the impedance of an otherwise microstrip layer. In some embodiments, conductive tracks rendered using one or more laser beams may be used to change the "tap points" off of resistor and/or inductor structures (e.g., in packaged R & L banks).

Figure 5:
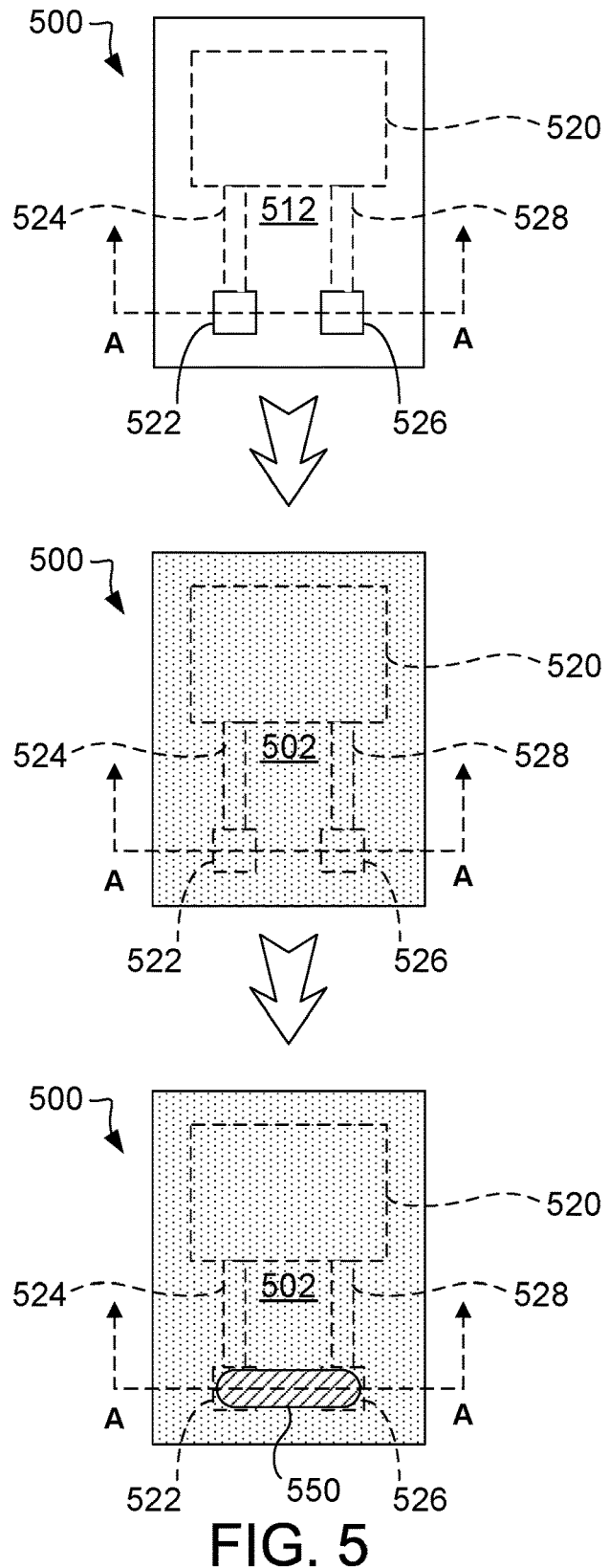
FIG. 5 is a top view of a portion of a multi-layer printed circuit board at a stage prior to application of a coating containing spinel-based, non-conductive metal oxide, and at stages before and after irradiation of the coating with a laser beam, according to embodiments of the present disclosure.
Figure 6:
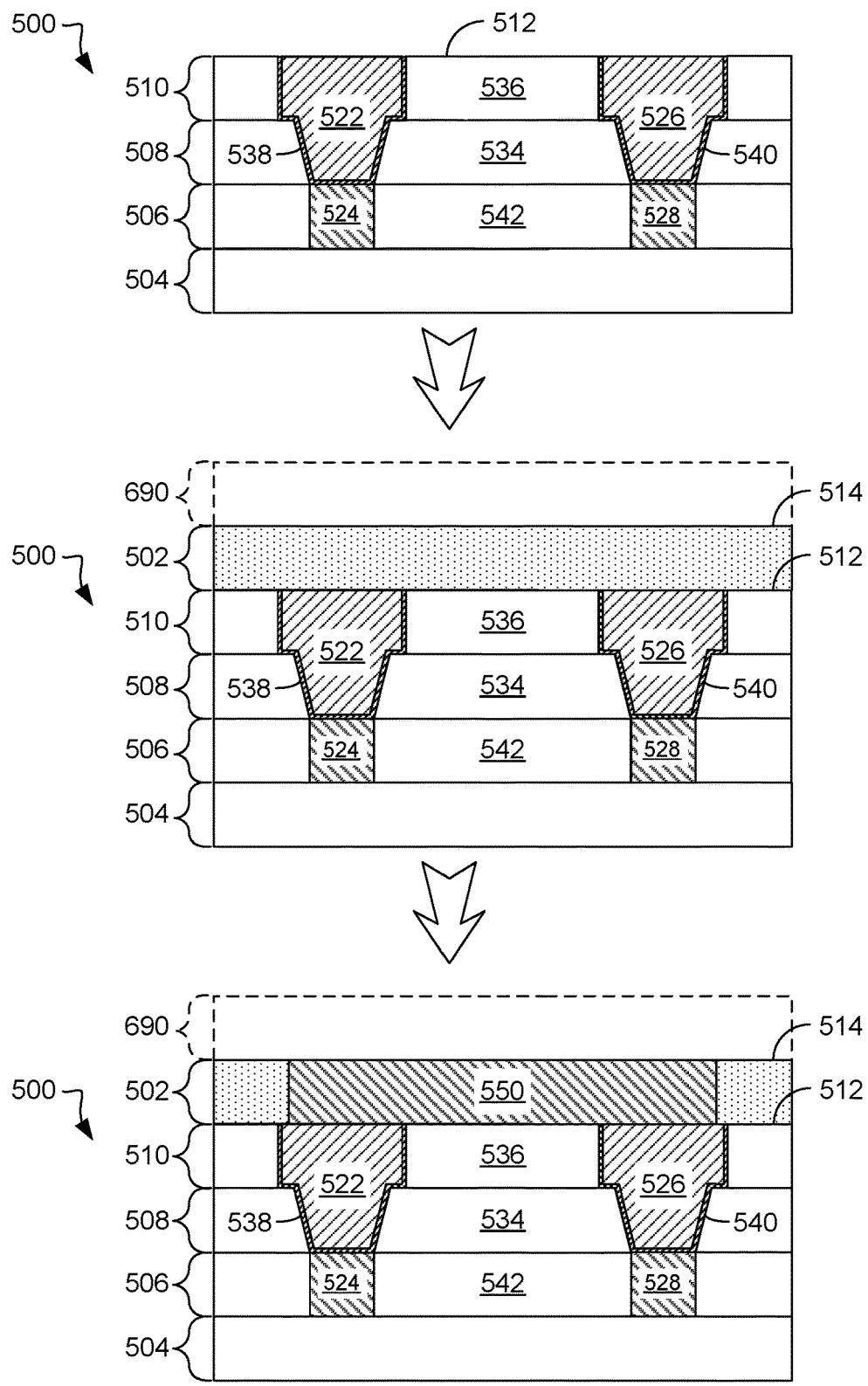
FIG. 6 is a cross-sectional elevational view of the portion of the multi-layer printed circuit board of FIG. 5 at a stage prior to application of the coating, and at stages before and after laser beam irradiation of the coating, according to embodiments of the present disclosure.

FIGS. 5 and 6 are, respectively, a top view and a cross-sectional elevation view of a portion of a multi-layer printed circuit board 500 at a stage prior to application of a coating 502 containing spinel-based, non-conductive metal oxide (and, optionally, application of an overcoating 690), and at stages before and after irradiation of the coating 502 (and, optionally, the overcoating 690) with a laser beam, according to embodiments of the present disclosure. The optional overcoating 690, which is shown only in FIG. 6, unlike the coating 502 does not contain spinel-based, non-conductive metal oxide. For each respective stage, the cross-sectional view of FIG. 6 is taken along section line A-A indicated in FIG. 5. The multi-layer printed circuit board 500 having the coating 502 (and, optionally, the overcoating 690) applied thereto may correspond to the printed circuit board 210 of FIG. 2 having the coating 255 applied thereto. With the exception of being coated with the coating 502, the multi-layer printed circuit board 500 may be conventional.

The upper portion of FIGS. 5 and 6 each shows the multi-layer printed circuit board 500 prior to application of the coating 502 (and, optionally, application of the overcoating 690). As best seen in FIG. 6, the multi-layer printed circuit board 500 includes a substrate 504 and a plurality of layers (e.g., a metal layer (Mx) 506, a dielectric layer 508, and a metal layer (Mx+1) 510) deposited on the substrate 504. The terms "dielectric layer" and "metal layer" may refer to a single physical layer structure containing both dielectric material and conductive material. Only three such layers 506, 508, 510 are illustrated in FIG. 6 as being deposited on the substrate 504. One skilled in the art will appreciate, however, that the multi-layer printed circuit board 500 may include any number of layers deposited on the substrate 504.

The substrate 504 can be a thin slice of semiconductor material, such as a silicon crystal, used in the fabrication of ICs, and can have microelectronic devices fabricated within it. A security-sensitive microelectronic device 520, as illustrated in FIG. 5, is an example of one of the microelectronic devices that can be fabricated within the substrate or elsewhere within the multi-layer printed circuit board 500. The security-sensitive microelectronic device 520 may, for example, be an encryption module and associated memory. In one embodiment, the security-sensitive microelectronic device 520 may be a high-speed serial (HSS) device. The security-sensitive microelectronic device 520 is denoted in FIG. 5 using hidden lines because, at least in the embodiment illustrated in FIG. 5, the security-sensitive microelectronic device 520 is embedded (out of sight) in the multi-layer printed circuit board 500. One skilled in the art will appreciate, however, that the security-sensitive microelectronic device 520 may be mounted on a surface of the multi-layer printed circuit board 500 (e.g., on surface 512) in lieu of being embedded within the multi-layer printed circuit board 500.

The security-sensitive microelectronic device 520 includes an input/output (e.g., a driver output) that is electrically connected to a via 522 through a wire 524 that extends through the metal layer (Mx) 506. The security-sensitive microelectronic device 520 also includes an input/output (or ground connection) that is connected to a via 526 (e.g., GND pad) through a wire 528 that extends through the metal layer (Mx) 506. The vias 522, 526, which are exposed on a surface 512 of the multi-layer printed circuit board 500, are formed of electrically conductive material within the dielectric layer 508 and the metal layer (Mx+1) 510. The vias 522, 526 are electrically isolated from each other within the dielectric layer 508 by dielectric material 534 and within the metal layer (Mx+1) 510 by dielectric material 536. The vias 522, 526 may be electrically connected to the wires 524, 528 through electrically conductive liners 538, 540. The wires 524, 528 are formed of electrically conductive material within the metal layer (Mx) 506. The wires 524, 528 are electrically isolated from each other within the metal layer (Mx) 506 by dielectric material 542.

The coating 502, which is formed on a surface 512 of the multi-layer printed circuit board 500, includes a spinel-based, non-conductive metal oxide mixed into a non-conductive supporting material. The optional overcoating 690, which is formed on a surface 514 of the coating 502, may be any suitable cover-coat material used in the fabrication of printed circuit boards. The coating 502 (and the optional overcoating 690) may be applied using liquid processes, such as curtain coating, silkscreen printing, spraying, dipping, spin-coating, casting, etc. Alternatively, the coating 502 (and the optional overcoating 690) may be applied as a dry film material using dry processes such as vacuum lamination.

The middle portion of FIGS. 5 and 6 each shows a stage before irradiation of the coating 502 with a laser beam; whereas, the lower portion of FIGS. 5 and 6 each shows a stage after irradiation of the coating 502 with a laser beam. For example, if a tamper event is detected by a sensor monitor, a conductive track writing controller may activate the conductive track writing unit (e.g., the conductive track writing unit 300 of FIG. 3 or the conductive track writing unit 400 of FIG. 4) to write one or more conductive tracks 550 within a predetermined portion of the coating 502 on the surface 512 of the multi-layer printed circuit board 500. As illustrated in the lower portions of FIGS. 5 and 6, the conductive track 550 electrically connects the vias 522, 526. By electrically connecting the vias 522, 526, the conductive track 540 may short a driver output of the security-sensitive microelectronic device 520 to ground, thereby disabling the security-sensitive microelectronic device 520. Alternatively, or in addition, the vias 522, 526 may be monitored by a monitoring agent, such as field-programmable gate array (FPGA) or other device. Additionally, in some embodiments, the laser beam is powerful enough to activate spinel-based conductor tracks buried just below the outside surface, which may offer a benefit by hiding the security track feature from visible detection. In other words, the laser beam may write one or more conductive tracks 550 within a predetermined portion of the coating 502 by passing through the optional overcoating 690, which may visually obscure the one or more conductive tracks 550.

Figure 7:
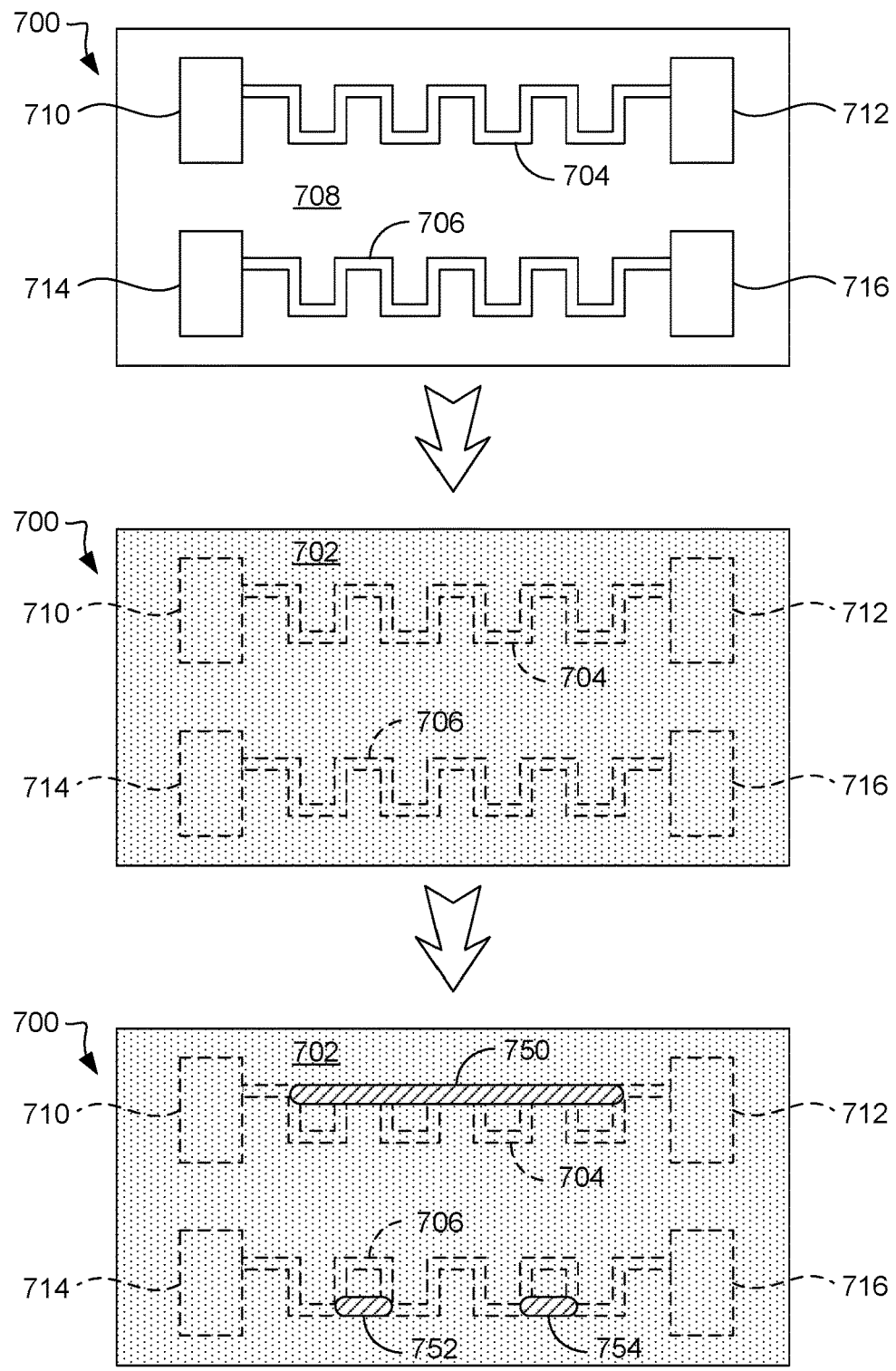
FIG. 7 is a top view of a portion of a printed circuit board having serpentine traces formed on a surface thereof at a stage prior to application of a coating containing spinel-based, non-conductive metal oxide, and at stages before and after irradiation of the coating with a laser beam, according to embodiments of the present disclosure.

FIG. 7 is a top view a portion of a printed circuit board 700 having serpentine traces 704, 706 formed on a surface thereof at a stage prior to application of a coating 702 containing spinel-based, non-conductive metal oxide, and at stages before and after irradiation of the coating 702 with a laser beam, according to embodiments of the present disclosure. The printed circuit board 700 having the coating 702 applied thereto may correspond to the printed circuit board 210 of FIG. 2 having the coating 255 applied thereto. With the exception of being coated with the coating 702, the printed circuit board 700 may be conventional.

The upper portion of FIG. 7 shows the printed circuit board 700 prior to application of the coating 702. In the embodiment illustrated in FIG. 7, two signal paths 704, 706 each having a serpentine configuration are exposed on a surface 708 of the printed circuit board 700. The two signal paths 704, 704 are also referred to herein as "serpentine traces". These serpentine traces 704, 706 each provides a predetermined delay that may be altered or shorted by writing one or more conductive tracks within the coating 702. One skilled in the art will appreciate, however, that any number of signal paths having any suitable configuration may be exposed on the surface 708 of the printed circuit board 700.

The signal path 704 extends between and electrically connects two electronic components or structures 710, 712. The electronic components or structures 710, 712 may be microelectronic devices, conductive structures (e.g., vias), or a combination thereof. One or more of the electronic components or structures 710, 712 may, for example, be a security-sensitive microelectronic device, such as an encryption module and associated memory.

The signal path 706 extends between and electrically connects two electronic components or structures 714, 716.

The electronic components or structures 714, 716 may be microelectronic devices, conductive structures (e.g., vias), or a combination thereof. One or more of the electronic components or structures 714, 716 may, for example, be a security-sensitive microelectronic device, such as an encryption module and associated memory.

The coating 702, which is formed on the surface 708 of the printed circuit board 700, includes a spinel-based, non-conductive metal oxide mixed into a non-conductive supporting material. The coating 702 may be applied using liquid processes, such as curtain coating, silkscreen printing, spraying, dipping, spin-coating, casting, etc. Alternatively, the coating 702 may be applied as a dry film material using dry processes such as vacuum lamination.

The middle portion of FIG. 7 shows a stage before irradiation of the coating 702 with a laser beam; whereas, the lower portion of FIG. 7 shows a stage after irradiation of the coating 702 with a laser beam. For example, if a tamper event is detected by a sensor monitor, a conductive track writing controller may activate the conductive track writing unit (e.g., the conductive track writing unit 300 of FIG. 3 or the conductive track writing unit 400 of FIG. 4) to write one or more conductive tracks 750, 752, 754 within predetermined portions of the coating 702 on the surface 708 of the printed circuit board 700. As illustrated in the lower portion of FIG. 7, the conductive track 750 shorts out the serpentine trace 704; whereas, the conductive tracks 752, 754 adjust the delay of the serpentine trace 706. Shorting out (in the case of the serpentine trace 704) or altering (in the case of the serpentine trace 706) the specific timing provided by the serpentine traces 704, 706 may, for example, disable a security-sensitive microelectronic device (e.g., one or more of the electronic structures 710, 712, 714, 716 may be a security-sensitive microelectronic device that requires the specific timing provided by the serpentine traces). Using this technique, it is possible to alter timing of a clock, HSS, or other signal paths.

Figure 8:
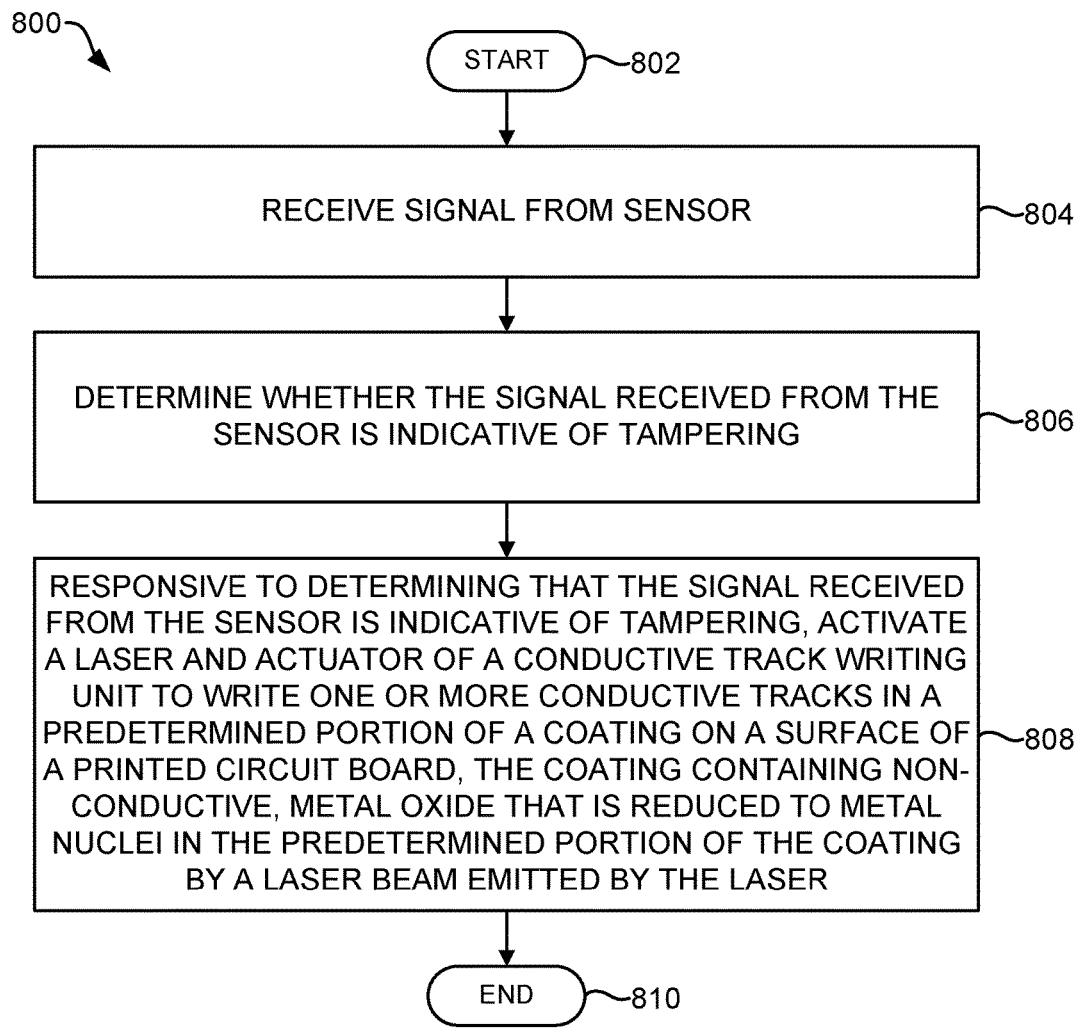
FIG. 8 is flow diagram illustrating a method for implementing security protection in a tamper-respondent system, according to embodiments of the present disclosure.

FIG. 8 is flow diagram illustrating a method 800 for implementing security protection in a tamper-respondent system, according to embodiments of the present disclosure. The method 800 can be useful in tamper-respondent system that has conductive track writing capabilities.

The process 800 moves from start 802 to operation 804. Operation 804 generally refers to the operation(s) that involve receiving a signal from a sensor. A sensor monitor, for example, may receive a signal from each of one or more tamper sensors and monitor the signal to determine whether a tampering event has occurred. For example, the sensor monitor may monitor a resistance of one or more carbon-loaded polyester tracks associated with the one or more tamper sensors (e.g., the resistance of tracks of carbon-loaded polyester ink printed onto opposite sides of an electrically insulating film that is folded to define a tamper sensor that surrounds an enclosure, such as the security mesh or tamper sensor 216 of FIG. 2) to detect an increase in resistance, caused by cutting of the carbon-loaded polyester tracks. Once the signal has been received from the sensor, the process 800 moves to operation 806.

Operation 806 generally refers to the operations(s) that involve determining whether the signal received from the sensor is indicative of tampering. As noted above, in operation 804, a sensor monitor may monitor a resistance of one or more carbon-loaded polyester tracks associated with the one or more tamper sensors to detect an increase in resistance, caused by cutting of the carbon-loaded polyester tracks. In operation 806, the sensor monitor may determine that a tampering event has occurred, for instance, if the monitored resistance exceeds a threshold value. Upon determination that the signal received from the sensor is indicative of tampering, the process 800 moves to operation 808.

Operation 808 generally refers to the operation(s) that involve writing one or more conductive tracks in a predetermined portion of a coating on a surface of a printed circuit board. In response to detection of tampering in operation 806, a conductive track writing controller, for example, may activate a laser and an actuator of a conductive track writing unit (e.g., the conductive track writing unit 300 of FIG. 3 or the conductive track writing unit 400 of FIG. 4) to form one or more conductive tracks.

For example, during operation 808, the conductive track writing controller 355 of FIG. 3 may activate the laser 306 of the conductive track writing unit 300 of FIG. 3; activate the linear actuator 308 of the conductive track writing unit 300 of FIG. 3 to move the then-activated laser 306 to irradiate, along a predetermined linear path, a predetermined portion of a coating applied on a surface of a printed circuit board to form a conductive track, defined by the predetermined linear path, within the coating by reducing spinel-based, non-conductive metal oxide in the coating to metal nuclei; and then deactivate the laser 306. The conductive track writing controller 355 may form additional conductive tracks by repeating the above-described sequence of operations. To form the conductive track 550 of FIG. 5, for example, a laser beam emitted by the laser may be moved along a predetermined linear path by the linear actuator to irradiate a predetermined portion of the coating 502 applied on the surface 512 of the printed circuit board 500 of FIG. 5.

In another example, during operation 808, the conductive track writing controller 455 of FIG. 4 may activate the laser 406 of the conductive track writing unit 400 of FIG. 4; activate the x-y plane actuator 408 of the conductive track writing unit 400 of FIG. 4 to move the then-activated laser 406 to irradiate, along a predetermined two-dimensional path, a predetermined portion of a coating applied on a surface of a printed circuit board to form a conductive track, defined by the predetermined two-dimensional path, within the coating by reducing spinel-based, non-conductive metal oxide in the coating to metal nuclei; and then deactivate the laser 406. The conductive track writing controller 455 may form additional conducive tracks by repeating the above-described sequence of operations. To form the conductive tracks 750, 752 and 754 of FIG. 7, for example, a laser beam emitted by the laser may be moved along a first, a second, and a third predetermined linear paths by the x-y plane actuator to irradiate predetermined portions of the coating 702 applied on the surface 708 of the printed circuit board 700 of FIG. 7.

Once all of the conductive tracks have been written in operation 808, the process may end at block 810.

In lieu of, or in addition to, being used as a security measure, a conductive track writing unit and a coating containing spinel-based, non-conductive metal oxide may be used as a system performance tool. For example, a conductive track writing unit (e.g., the conductive track writing unit 400 of FIG. 4) and a coating containing spinel-based, non-conductive metal oxide applied on a surface of a printed circuit board may be used to adjust for differential pair skew of an electronic device (e.g., a HSS device) mounted on or embedded within the printed circuit board. An example of the use of these components (i.e., a conductive track writing unit and a coating containing spinel-based, non-conductive metal oxide) as a system performance tool in the context of adjusting for differential pair skew is illustrated in FIG. 9.

One skilled in the art will appreciate, however, that these components may be used as a system performance tool in other contexts.

When a signal is propagated on a differential pair of conductive traces routed on a printed circuit board at the board level (or on a chip at a chip level), each trace propagates a mirror image wave form. That is, a differential pair is two complementary conductive traces that transfer equal and opposite signals down their length. Differential pairs are also referred to as "differential trace pairs." Differential pair skew refers to the time difference between the two single-ended signals in a differential pair. A variety of sources can contribute to differential pair skew. For example, one cause of skew is a length mismatch created when a differential pair is routed through a turn (i.e., the outer leg of the differential pair is longer than the inner leg of the differential pair).

Figure 9:
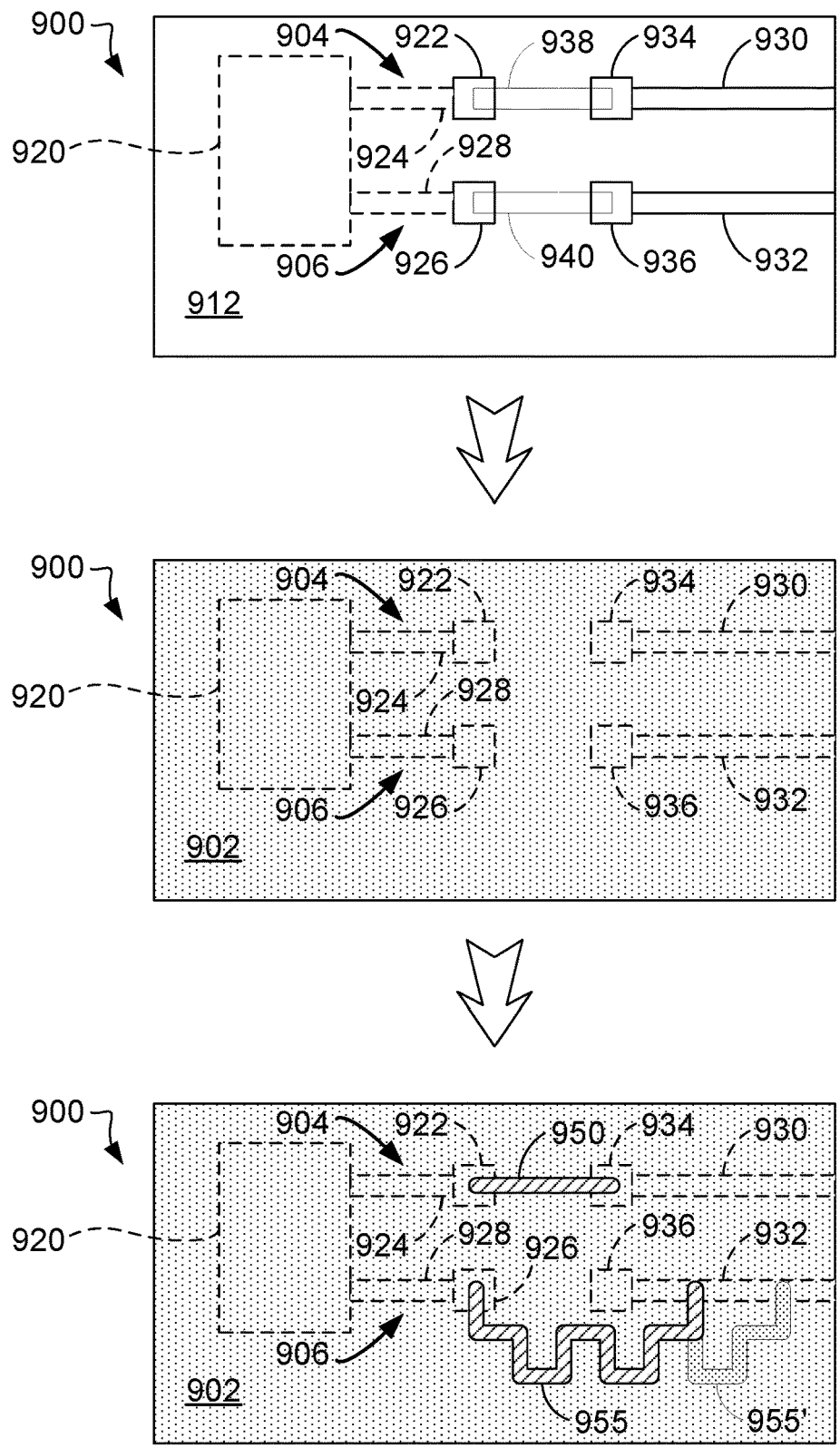
FIG. 9 is a top view of a portion of a multi-layer printed circuit board having a differential pair formed on a surface thereof at a stage prior to application of a coating containing spinel-based, non-conductive metal oxide, and at stages before and after irradiation of the coating with a laser beam, according to embodiments of the present disclosure.

FIG. 9 is a top view of a portion of a multi-layer printed circuit board 900 having a differential pair of conductive traces 904, 906 formed on a surface thereof at a stage prior to application of a coating 902 containing spinel-based, non-conductive metal oxide, and at stages before and after irradiation of the coating 902 with a laser beam, according to embodiments of the present disclosure. The multi-layer printed circuit board 900 having the coating 902 applied thereto may correspond to the printed circuit board 210 of FIG. 2 having the coating 255 applied thereto. The multi-layer printed circuit board 900 may also correspond to and have the same general construction as the multi-layer printed circuit board 500 of FIG. 5 having the coating 502 applied thereto.

The upper portion of FIG. 9 shows the multi-layer printed circuit board 900 prior to application of the coating 902. The differential pair 904, 906 is associated with a microelectronic device 920 that is embedded within the multi-layer printed circuit board 900. The microelectronic device 920 may correspond to the security-sensitive microelectronic device 520 of FIGS. 5 and 6. The microelectronic device 920 may, for example, be an encryption module and associated memory. In one embodiment, the microelectronic device 920 may be a high-speed serial (HSS) device. The microelectronic device 920 is denoted in FIG. 9 using hidden lines because, at least in the embodiment illustrated in FIG. 9, the microelectronic device 920 is embedded (out of sight) in the multi-layer printed circuit board 900. One skilled in the art will appreciate, however, that the microelectronic device 920 may be mounted on a surface of the multi-layer printed circuit board 900 (e.g., on surface 912) in lieu of being embedded within the multi-layer printed circuit board 900.

The microelectronic device 920 includes an input/output that is electrically connected to a via 922 through an embedded wire 924. The microelectronic device 920 also includes an input/output that is connected to a via 926 through an embedded wire 928. The vias 922, 926, which are exposed on a surface 912 of the multi-layer printed circuit board 900, are formed of electrically conductive material. The surface 912 of the multi-layer printed circuit board 900 also has two conductive traces 930, 932 exposed thereon, which terminate as two conductive pads 934, 936.

The first conductive trace 904 of the differential pair includes the embedded wire 924, the via 922, the conductive pad 934, and the conductive trace 930. The second conductive trace 906 of the differential pair includes the embedded wire 928, the via 926, the conductive pad 936, and the conductive trace 932. To allow for correction of differential pair skew, an adjustment discontinuity is provided in each of the first and second conductive traces 904, 906 of the differential pair. That is, in the first conductive trace 904 of the differential pair, an adjustment discontinuity is provided between the via 922 and the conductive pad 934. Similarly, in the second conductive trace 906 of the differential pair, an adjustment discontinuity is provided between the via 926 and the conductive pad 936.

The adjustment discontinuities may be temporarily populated by zero Ohm resistors 938, 940 to train the interface. That is, a zero Ohm resistor 938 may be electrically connected between the via 922 and the conductive pad 934 to temporarily populate the adjustment discontinuity in the first conductive trace 904 of the differential pair. Similarly, a zero Ohm resistor 940 may be electrically connected between the via 926 and the conductive pad 936 to temporarily populate the adjustment discontinuity in the second conductive trace 906 of the differential pair. With the discontinuities temporarily populated by zero Ohm resistors 938, 940, the interface may be trained. Once the interface is trained, the zero Ohm resistors 938, 940 may be removed.

The coating 902, which is formed on a surface 912 of the multi-layer printed circuit board 900, includes a spinel-based, non-conductive metal oxide mixed into a non-conductive supporting material. The coating 902 may be applied using liquid processes, such as curtain coating, silkscreen printing, spraying, dipping, spin-coating, casting, etc. Alternatively, the coating 902 may be applied as a dry film material using dry processes such as vacuum lamination.

The middle portion of FIG. 9 shows a stage before irradiation of the coating 902 with a laser beam; whereas, the lower portion of FIG. 9 shows a stage after irradiation of the coating 902 with a laser beam. For example, a conductive track writing controller may activate the conductive track writing unit (e.g., the conductive track writing unit 300 of FIG. 3 or the conductive track writing unit 400 of FIG. 4) to write the correct deskew conductive tracks 950, 955 within a predetermined portions of the coating 902 on the surface 912 of the multi-layer printed circuit board 900. Because the conductive tracks 950, 955 have lengths that are adjustable with respect to each other, it is possible to adjust for differential pair skew by writing the correct deskew conductive tracks 950, 955.

As illustrated in the lower portion of FIG. 9, a conductive track 950 having a straight configuration (i.e., minimum delay), for example, may be written to electrically connect the via 922 and the conductive pad 934 in the first conductive trace 904 of the differential pair. As also illustrated in the lower portion of FIG. 9, a conductive track 955 having a serpentine configuration (i.e., moderate delay), for example, may be written to electrically connect the via 926 and the conductive trace 932 in the second conductive trace 906 of the differential pair. That is, in the particular example illustrated in FIG. 9, relatively more delay is required to be added in the second conductive trace 906 of the differential pair (i.e., relative to the delay added in the first conductive trace 904 of the differential pair) to adjust for (or eliminate) differential pair skew. Alternatively, if even more delay is required to be added in the second conductive trace 906 of the differential pair to adjust for (or eliminate) differential pair skew, a conductive track 955' having a serpentine configuration that is slightly longer may be written to electrically connect the via 926 and the conductive trace 932. The conductive track 955' is slightly longer than conductive track 955 and, therefore, the conductive track 955' would add more delay to the second conductive trace 906 of the differential pair than would be added by the conductive track 955.

Figure 10:
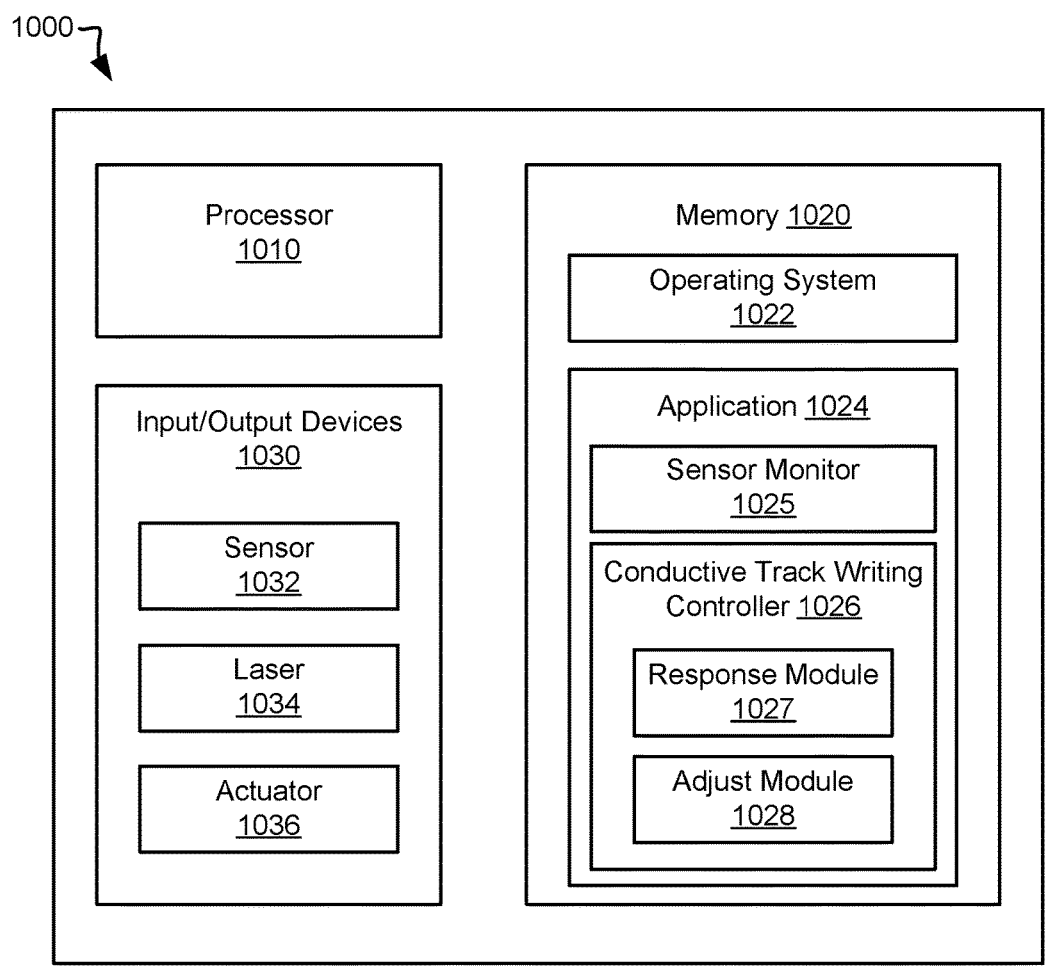
FIG. 10 is a block diagram illustrating an example system, according to embodiments of the present invention.

FIG. 10 illustrates an example system 1000. The system 1000 may be a computer such as a server computer or the like. The system 1000 may include, among other components, a processor 1010, a memory 1020, and one or more input and/or output (I/O) devices 1030 that are communicatively coupled via a local interface (not shown). The local interface can be, for example, but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 1010 may be a central processor of the system 1000 responsible for execution of an operating system, control instructions, and applications installed on the system 1000. The processor 1010 may be one or more devices operable to execute logic. The logic may include computer executable instructions or computer code embodied in the memory 1020 or in other memory that when executed by the processor 1010, cause the processor 1010 to perform the features implemented by the logic. The computer code may include instructions executable with the processor 1010. The computer code may include embedded logic. The computer code may be written in any computer language now known or later discovered. The computer code may include source code and/or compiled code. The processor 1010 may be a general processor, central processing unit (CPU), server, application specific integrated circuit (ASIC), digital signal processor (DSP), field programmable gate array (FPGA), digital circuit, analog circuit, or combinations thereof. The processor 1010 may be in communication with the memory 1020 and the other components of the system 1000. In one example, the processor 1010 may also be in communication with additional elements, such as the I/O devices 1030.

The memory 1020 may be non-transitory computer storage medium. The memory 1020 may be DRAM, SRAM, Flash or any other type of memory or a combination thereof. The memory 1020 may store an operating system 1022 and one or more applications 1024 that are executable by the processor 1010. The application 1024 may include functional components (e.g., a sensor monitor 1025 and a conductive track writing controller 1026, which may include a response module 1027 and an adjust module 1028) for implementing the features and operations of the exemplary embodiments. The operating system 1022 and the application 1024 may be stored on the memory 1020 by the manufacturer, provider, or end-user of the system 1000. The memory 1020 may contain other data such as images, videos, documents, spreadsheets, audio files, and other data that may be associated with operation of the system 1000. For example, the memory 1020 may be used to store an event record log (not shown). One skill in the art will appreciate that the memory 1020 can have a distributed architecture, where various components are situated remote from one another, but can be accessed by the processor 1010.

The operating system 1022 controls the execution of other computer programs, and provides scheduling, input-output control, file and data management, memory management, and communication control and related services. It is contemplated by the inventors that the application 1024 for implementing exemplary embodiments may be applicable on all commercially available operating systems.

The application 1024 may be a source program, an executable program (object code), script, or any other entity comprising a set of instructions to be performed. When the application 1024 is a source program, then the program is usually translated via a compiler, assembler, interpreter, or the like, which may or may not be included within the memory 1020, so as to operate properly in connection with the operating system 1022. Furthermore, the application 1024 can be written in any combination of one or more programming languages, including an object oriented programming language such as Smalltalk, C++, or the like, and procedural programming languages, such as the "C" programming language or similar programming languages.

In exemplary embodiments, where the application 1024 is implemented in hardware, the application 1024 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

As illustrated, the application 1024 may comprise numerous functional components (e.g., a sensor monitor 1025 and a conductive track writing controller 1026, which may include a response module 1027 and an adjust module 1028) for implementing the features and operations of the exemplary embodiments. The application 1024 may represent various applications, computational units, logic, functional units, processes, operations, virtual entities, and/or modules in accordance with exemplary embodiments, but the application 1024 is not meant to be limiting.

The sensor monitor 1025 may, for example, be responsible for monitoring one or more sensors 1032 to determine whether a tampering event has occurred. For example, the sensor monitor 1025 may monitor a resistance of one or more carbon-loaded polyester tracks associated with the one or more sensors 1032 (e.g., the resistance of tracks of carbon-loaded polyester ink printed onto opposite sides of an electrically insulating film that is folded to define a tamper sensor that surrounds an enclosure, such as the security mesh or tamper sensor 216 of FIG. 2) to detect an increase in resistance, caused by cutting of the carbon-loaded polyester tracks. The sensor monitor 1032 may determine that a tampering event has occurred, for instance, if the monitored resistance exceeds a threshold value.

The conductive track writing controller 1026 illustrated in FIG. 10 may correspond to the conductive track writing controller 355 of FIG. 3, as well as the conductive track writing controller 455 of FIG. 4. In the embodiment illustrated in FIG. 10, the conductive track writing controller 1026 includes a response module 1027 and an adjust module 1028.

The response module 1027 may, for example, be responsible for activating, responsive to the sensor monitor 1026 determining that a tampering event has occurred, a conductive track writing unit (e.g., the conductive track writing unit 300 of FIG. 3 or the conductive track writing unit 400 of FIG. 4) to protect an encryption module and an associated memory. For example, if an increase in the resistance of the tracks is detected by the sensor monitor 1026, the response module 1027 may activate a laser 1034 and an actuator 1036 of the conductive track writing unit to write one or more conductive tracks on a surface of the printed circuit board in which the encryption module and the associated memory are embedded to disable the encryption module and the associated memory. The response module 1027 may, for example, be responsible for implementing the operations illustrated in FIG. 8.

The adjust module 1028 may, for example, be responsible for activating a conductive track writing unit (e.g., the conductive track writing unit 300 of FIG. 3 or the conductive track writing unit 400 of FIG. 4) to increase system performance. For example, the adjust module 1028 may activate a laser 1034 and an actuator 1036 of the conductive track writing unit to write one or more conductive tracks on a surface of the printed circuit board to adjust for differential pair skew by adding the correct deskew conductive tracks. The adjust module 1028 may, for example, be responsible for implementing the operations described above with reference to the differential pair illustrated in FIG. 9.

The I/O devices 1030 may include input devices such as, for example, but not limited to, a mouse, keyboard, scanner, microphone, camera, etc. Furthermore, the I/O devices 1030 may also include output device, for example, but not limited to, a printer, display, etc. Still further, the I/O devices 1030 may also include devices that communicate both inputs and outputs, for instance, but not limited to, a NIC or modulator/demodulator (for accessing remote devices, other files, devices, systems, or a network), a radio frequency (RF) or other transceiver, a telephonic interface, a bridge, a router, etc. The I/O devices 1030 may also include components for communicating over various networks, such as the Internet or intranet. In accordance with some embodiments, the I/O devices 1030 may include one or more sensors 1032, one or more lasers 1034, and one or more actuators 1036.

The one or more sensors 1032 illustrated in FIG. 10 may correspond to the tamper sensor 120 of FIG. 1, as well as the security mesh or tamper sensor 216 of FIG. 2.

The one or more lasers 1034 illustrated in FIG. 10 may correspond to the laser 306 of FIG. 3, as well as the laser 406 of FIG. 4.

The one or more actuators 1036 illustrated in FIG. 10 may correspond to the linear actuator 308 of FIG. 3, as well as the x-y plane actuator 408 of FIG. 4.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One skilled in the art will appreciate that many variations are possible within the scope of the present invention. Thus, while the present invention has been particularly shown and described with reference to some embodiments thereof, it will be understood by those skilled in the art that changes in form and detail may be made therein without departing from the spirit and scope of the present invention.

What is claimed is:

1. A method for implementing security protection in a tamper-respondent system, the method comprising:
   receiving a signal from a sensor;
   determining whether the signal received from the sensor is indicative of tampering;
   responsive to determining that the signal received from the sensor is indicative of tampering, activating a conductive track writing unit to write a conductive track within a predetermined portion of a coating on a surface of a printed circuit board (PCB) by irradiating the predetermined portion of the coating to reduce a spinel-based, non-conductive metal oxide in the predetermined portion of the coating to metal nuclei, wherein activating the conductive track writing unit to write the conductive track within the predetermined portion of the coating includes irradiating the predetermined portion of the coating through an overcoating on a surface of the coating, wherein the overcoating visually obscures the conductive track.

2. The method as recited in claim 1, wherein the conductive track electrically connects a driver output of a security-sensitive microelectronic device mounted on or embedded within the PCB to ground by connecting a first via on the surface of the PCB and a second via on the surface of the PCB to each other, wherein the first via on the surface of the PCB is electrically connected to the driver output of the security-sensitive microelectronic device and the second via on the surface of the PCB is electrically connected to ground.

3. The method as recited in claim 1, wherein the conductive track shorts out a portion of a serpentine conductive trace formed on the surface of the PCB.

4. The method as recited in claim 1, further comprising:
   providing a printed circuit board (PCB) having a differential pair of conductive traces formed on a surface thereof, wherein the differential pair of conductive traces includes a first conductive trace and a second conductive trace, wherein each of the first and second conductive traces includes an adjustment discontinuity, and wherein the PCB having the differential pair of conductive traces has a coating containing spinel-based, non-conductive metal oxide applied thereto over the differential pair of conductive traces;
   adjusting for differential pair skew by activating a conductive track writing unit to write a conductive track, bridging the adjustment discontinuity for each of the first and second conductive traces, within a predetermined portion of the coating by irradiating the predetermined portion of the coating to reduce a spinel-based, non-conductive metal oxide in the predetermined portion of the coating to metal nuclei.

5. A tamper-respondent system, comprising:
   a printed circuit board (PCB) having a coating on a surface thereof, wherein the coating includes spinel-based, non-conductive metal oxide mixed into a non-conductive supporting material;
   a conductive track writing unit;
   a sensor;
   an enclosure substantially enclosing the PCB, the conductive track writing unit, and the sensor;
   wherein responsive to a determination that a signal output from the sensor is indicative of tampering, the conductive track writing unit writes a conductive track within a predetermined portion of the coating by irradiating the predetermined portion of the coating to reduce the spinel-based, non-conductive metal oxide in the predetermined portion of the coating to metal nuclei, wherein the conductive track writing unit writes the conductive track within the predetermined portion of the coating by irradiating the predetermined portion of the coating through an overcoating on a surface of the coating, wherein the overcoating visually obscures the conductive track.

6. The tamper-respondent system as recited in claim 5, wherein the spinel-based, non-conductive metal oxide contains copper.

7. The tamper-respondent system as recited in claim 5, wherein the spinel-based, non-conductive metal oxide contains a metal selected from a group consisting of copper, chromium, iron, cobalt, nickel, and mixtures of two or more of the foregoing.

8. The tamper-respondent system as recited in claim 5, wherein the non-conductive supporting material comprises a synthetic resin material.

9. The tamper-respondent system as recited in claim 5, wherein the sensor comprises a folded tamper-respondent laminate that comprises non-metallic conductive traces deposited on a flexible non-conductive substrate.

10. The tamper-respondent system as recited in claim 5, wherein the conductive track writing unit comprises a Nd:YAG laser.

11. The tamper-respondent system as recited in claim 5, wherein the conductive track writing unit comprised a laser mounted on a linear actuator driven by a stepper motor.

12. The tamper-respondent system as recited in claim 5, wherein the conductive track writing unit comprises a laser mounted on an x-y plane actuator driven by a plurality of stepper motors.

13. The tamper-respondent system as recited in claim 5, further comprising:
   a security-sensitive microelectronic device mounted on or embedded within the PCB;
   a first via on the surface of the PCB;
   a second via on the surface of the PCB;
   wherein the conductive track electrically connects a driver output of the security-sensitive microelectronic device to ground by connecting the first via and the second via to each other, wherein the first via is electrically connected to the driver output of the security-sensitive microelectronic device and the second via is electrically connected to ground.

14. The tamper-respondent system as recited in claim 5, further comprising:
   a serpentine conductive trace formed on the surface of the PCB;
   wherein the conductive track that shorts out a portion of a serpentine conductive trace.

15. The tamper-respondent system as recited in claim 5, further comprising:
   a memory;
   a processor coupled to the memory;
   wherein the enclosure further substantially encloses the memory and the processor, and wherein the memory contains a program that, when executed by the processor, performs a method comprising:
   receiving a signal from the sensor;
   determining whether the signal received from the sensor is indicative of tampering;
   responsive to determining that the signal received from the sensor is indicative of tampering, activating the conductive track writing unit.

16. A computer program product for implementing security protection in a tamper-respondent system, the computer program product comprising a computer readable storage medium having program code embodied therewith, the program code executable by a processor or other programmable data processing apparatus to perform a method comprising:
   receiving a signal from a sensor;
   determining whether the signal received from the sensor is indicative of tampering;
   responsive to determining that the signal received from the sensor is indicative of tampering, activating a conductive track writing unit to write a conductive track within a predetermined portion of a coating on a surface of a printed circuit board (PCB) by irradiating the predetermined portion of the coating to reduce a spinel-based, non-conductive metal oxide in the predetermined portion of the coating to metal nuclei, wherein activating the conductive track writing unit to write the conductive track within the predetermined portion of the coating includes irradiating the predetermined portion of the coating through an overcoating on a surface of the coating, wherein the overcoating visually obscures the conductive track.

17. The computer program product as recited in claim 16, wherein the conductive track shorts out a portion of a serpentine conductive trace formed on the surface of the PCB.

* * * * *